US008631401B2

(12) United States Patent
Bansal et al.

(10) Patent No.: US 8,631,401 B2
(45) Date of Patent: Jan. 14, 2014

(54) CAPACITY PLANNING BY TRANSACTION TYPE

(75) Inventors: Jyoti Kumar Bansal, San Francisco, CA (US); David Isaiah Seidman, San Francisco, CA (US); Mark Jacob Addleman, San Francisco, CA (US)

(73) Assignee: CA, Inc., Islandia, NY (US)

( * ) Notice: Subject to any disclaimer, the term of this patent is extended or adjusted under 35 U.S.C. 154(b) by 1614 days.

(21) Appl. No.: 11/782,346

(22) Filed: Jul. 24, 2007

(65) Prior Publication Data

US 2009/0031066 A1    Jan. 29, 2009

(51) Int. Cl.
 *G06F 9/455*   (2006.01)

(52) U.S. Cl.
 USPC .......................................................... 718/1

(58) Field of Classification Search
 USPC ........................................................ 718/104
 See application file for complete search history.

(56) References Cited

U.S. PATENT DOCUMENTS

| | | | |
|---|---|---|---|
| 5,960,181 A | 9/1999 | Sanadidi et al. | |
| 6,260,187 B1 | 7/2001 | Cirne | |
| 6,760,684 B1 | 7/2004 | Yang et al. | |
| 6,816,882 B1 * | 11/2004 | Conner et al. | 709/203 |
| 6,862,623 B1 | 3/2005 | Odhner et al. | |
| 6,898,564 B1 | 5/2005 | Odhner et al. | |
| 7,243,145 B1 | 7/2007 | Poortman | |
| 7,249,179 B1 * | 7/2007 | Romero et al. | 709/226 |
| 7,284,052 B1 | 10/2007 | Anderson | |
| 7,577,770 B2 | 8/2009 | Tanaka et al. | |
| 7,665,090 B1 | 2/2010 | Tormasov et al. | |
| 7,711,822 B1 * | 5/2010 | Duvur et al. | 709/226 |
| 7,941,427 B2 | 5/2011 | Barsness et al. | |
| 2002/0152305 A1 | 10/2002 | Jackson et al. | |
| 2002/0194251 A1 * | 12/2002 | Richter et al. | 709/105 |
| 2004/0078691 A1 | 4/2004 | Cirne et al. | |
| 2005/0005012 A1 | 1/2005 | Odhner et al. | |
| 2005/0091654 A1 | 4/2005 | Lection et al. | |
| 2005/0120111 A1 | 6/2005 | Bailey et al. | |
| 2005/0183084 A1 | 8/2005 | Cuomo et al. | |
| 2005/0251802 A1 | 11/2005 | Bozek et al. | |
| 2006/0047808 A1 | 3/2006 | Sharma et al. | |
| 2006/0062148 A1 | 3/2006 | Ajiro et al. | |
| 2006/0080389 A1 | 4/2006 | Powers et al. | |
| 2006/0085541 A1 | 4/2006 | Cuomo et al. | |

(Continued)

OTHER PUBLICATIONS

"Capacity Planning: Discipline for Data Center Decisions", TeamQuest Corporation, TQ-EB01 Rev. A, 2004, 34 pages.

(Continued)

*Primary Examiner* — Emerson Puente
*Assistant Examiner* — Charlie Sun
(74) *Attorney, Agent, or Firm* — Vierra Magen Marcus LLP

(57) ABSTRACT

Capacity planning is performed based on expected transaction load and the resource utilization for each expected transaction. Resource usage is determined for one or more transactions or URLs based on transaction specific and non-transaction specific resource usage. Once the resource usage for each transaction is known, the expected resource usage may be determined for an expected quantity of each transaction. The actual resources needed to meet the expected resource usage are then determined. Resources may include hardware or software, such as a central processing unit, memory, hard disk bandwidth, network bandwidth, and other computing system components. The expected resource usage for a transaction may based on the usage directly related to the transaction and usage not directly related to the transaction but part of a process associated with the performed transactions.

40 Claims, 18 Drawing Sheets

(56) References Cited

U.S. PATENT DOCUMENTS

| | | | |
|---|---|---|---|
| 2006/0143608 | A1 | 6/2006 | Dostert et al. |
| 2006/0173877 | A1 | 8/2006 | Findeisen et al. |
| 2006/0200546 | A9 | 9/2006 | Bailey et al. |
| 2006/0200820 | A1* | 9/2006 | Cherkasova et al. .............. 718/1 |
| 2006/0218551 | A1 | 9/2006 | Berstis et al. |
| 2006/0259621 | A1 | 11/2006 | Ranganathan et al. |
| 2007/0061813 | A1 | 3/2007 | Beal et al. |
| 2007/0168494 | A1 | 7/2007 | Liu et al. |
| 2008/0034082 | A1* | 2/2008 | McKinney .................... 709/224 |
| 2008/0086734 | A1 | 4/2008 | Jensen et al. |
| 2008/0114870 | A1 | 5/2008 | Pu |
| 2008/0172671 | A1 | 7/2008 | Bouillet et al. |
| 2008/0235397 | A1 | 9/2008 | Degenaro et al. |
| 2008/0250420 | A1 | 10/2008 | Berstis et al. |
| 2008/0270526 | A1 | 10/2008 | Barnett et al. |
| 2009/0178051 | A1 | 7/2009 | Zyuban et al. |
| 2009/0199196 | A1 | 8/2009 | Peracha |
| 2009/0235268 | A1 | 9/2009 | Seidman et al. |

OTHER PUBLICATIONS

Office Action dated Jul. 6, 2011, U.S. Appl. No. 12/024,783, filed Feb. 1, 2008, 10 pages.
Office Action dated Aug. 31, 2011, U.S. Appl. No. 12/049,840, filed Mar. 17, 2008, 25 pages.
Response to Office Action dated Oct. 4, 2011, U.S. Appl. No. 12/024,783, filed Feb. 1, 2008, 10 pages.
U.S. Appl. No. 12/049,840, filed Mar. 17, 2008.
U.S. Appl. No. 12/024,783, filed Feb. 1, 2008.
Notice of Allowance and Fee(s) Due dated Dec. 5, 2012, U.S. Appl. No. 12/049,840, filed Mar. 17, 2008, 10 pages.
Notice of Allowance and Fee(s) Due dated Jun. 4, 2012, U.S. Appl. No. 12/024,783, filed Feb. 1, 2008, 13 pages.
Office Action dated Aug. 14, 2012, U.S. Appl. No. 12/049,840, filed Mar. 17, 2008, 18 pages.
Response A to Office Action dated Nov. 29, 2011, U.S. Appl. No. 12/049,840, filed Mar. 17, 2008, 17 pages.
Office Action dated Dec. 20, 2011, U.S. Appl. No. 12/024,783, filed Feb. 1, 2008, 30 pages.
Response to Office Action dated Oct. 31, 2012, U.S. Appl. No. 12/049,840, filed Mar. 17, 2008, 13 pages.
Final Office Action dated Feb. 14, 2012, U.S. Appl. No. 12/049,840, filed Mar. 17, 2008, 30 pages.
Response to Office Action dated Mar. 2, 2012, U.S. Appl. No. 12/024,783, filed Feb. 1, 2008, 17 pages.

* cited by examiner

Resource Usage Per Transaction

| URL | CPU usage direct | CPU usage attributed (of 2 ms) | memory usage direct | memory usage attributed (of 240 bytes) | HD BW usage direct | HD BW usage attributed (of 800 bytes/sec) | Network BW usage direct | Network BW usage attributed (of 600 bytes/sec) |
|---|---|---|---|---|---|---|---|---|
| http://site.com/productpage/dvd/children/animated | 6 ms | 1 ms | 100 bytes | 40 bytes | 1200 bytes/sec | 228 bytes/sec | 1000 bytes/sec | 150 bytes/sec |
| http://site.com/productpage/dvd/children/education | 3 ms | 0.5 ms | 200 bytes | 80 bytes | 2200 bytes/sec | 419 bytes/sec | 2000 bytes/sec | 300 bytes/sec |
| http://site.com/productpage/dvd/children/movies | 3 ms | 0.5 ms | 300 bytes | 120 bytes | 1800 bytes/sec | 342 bytes/sec | 1000 bytes/sec | 150 bytes/sec |

*Figure 15A*

Expected Resource Usage for Expected Transaction

| URL | Txns expected | Total CPU usage/txn | CPU usage expected | Total memory usage/txn | memory usage expected | Total HD BW usage/txn | HD BW usage expected | Total Network BW usage/txn | Network BW usage expected |
|---|---|---|---|---|---|---|---|---|---|
| http://site.com/productpage/dvd/children/animated | 20 | 7 ms | 140 ms | 140 bytes | 2.8 KB | 1420 bytes/sec | 28.4 KB/sec | 1150 bytes/sec | 23 KB/sec |
| http://site.com/productpage/dvd/children/education | 40 | 3.5 ms | 130 ms | 280 bytes | 11.2 KB | 2619 bytes/sec | 104.8 KB/sec | 2300 bytes/sec | 92 KB/sec |
| http://site.com/productpage/dvd/children/movies | 50 | 3.5 ms | 175 ms | 420 bytes | 21 KB | 2142 bytes/sec | 107.1 KB/sec | 1150 bytes/sec | 57.5 KB/sec |

Total Resource usage expected: 445 ms    35 KB    240.3 KB/sec    172.5 KB/sec

*Figure 15B*

CAPACITY PLANNING BY TRANSACTION TYPE

BACKGROUND

Traditional capacity planning is limited in that it is system oriented. The task typically has been approached as a way to determine the overall resource amount that is required by a server to meet an expected demand. After determining the resource amount, the amount of each resource required by a future time is predicted using a variety of modeling techniques.

Traditional capacity planning techniques have disadvantages because they are not accurate. In particular, modern transactional systems incur different load levels over time for a variety of reasons. The system load may include transaction types which incur different capacity demands on the system. Thus, previous capacity planning techniques may not accurately account for all factors that affect resource usage when determining the amount of a resource required as a direct result of one or more transactions. For example, users purchasing a product may require much more system capacity than a user browsing a catalog. Furthermore, key predictive inputs, such as new marketing campaigns, are rarely measured in terms of overall server usage. Predicting capacity planning as accurately as possible for a network application or server is valuable.

SUMMARY

The technology described herein pertains to capacity planning based on expected transaction load and the resource utilization for each expected transaction. Resource usage is determined for one or more transactions based on transaction specific and non-transaction specific use of one or more resources. The non-transaction specific resource usage is not directly caused by any transaction, but is attributed to one or more transactions which can be associated with the usage. Once the resource usage for each transaction is determined, the expected resource usage may be determined for an expected quantity of each transaction. The actual resources needed to meet the expected resource usage can then be determined. Resources may include hardware or software, such as a central processing unit, memory, hard disk input and output bandwidth, network send and receive bandwidth, and other computing system components. In some embodiments, the resource usage may be associated with a URL.

In some embodiments, the resource utilization for a transaction may include the usage directly related to the transaction and usage not directly related to the transaction. The resource utilization directly related to a transaction may be the use of the resource that is directly caused or required by the transaction. Additional resource usage may be incurred indirectly from performance of one or more transactions or a process in which the transaction are performed. Non-transaction specific resource usage that is not a direct result of a transaction may be apportioned to the one or more transactions it is indirectly associated with. The additional resource usage may be apportioned to one or more transactions based on the percentage load over a period of time in which the non-transaction specific usage occurred or in some other manner.

An embodiment monitors transactions. The transaction may be monitored by receiving requests to perform two or more transactions. The transactions may then be performed in response to the requests using one or more resources. The usage level of each of the one or more resources is then determined for one of the transactions of the two or more transactions performed.

An embodiment monitors transactions by receiving a request to perform a transaction. The request is associated with a thread which performs the transaction. Transaction execution utilizes one or more computer components. The utilization of each of the one or more computer components is determined by the thread while performing the transaction and includes computer component usage directly resulting from the transaction and usage that is not a direct result of the transaction.

An embodiment includes a method which performs a transaction by a system. The transaction is performed using one or more resources. Application runtime data is received regarding the one or more resources. An amount of each resources used to perform the transaction is then determined using the application runtime data. The amount of each resource is determined from transaction-specific application runtime data and non-transaction specific data. The number of resources needed to meet an expected capacity is determined based on the amount of each of the resources used to perform the transaction.

An embodiment determines usage level of one or more resources. Requests are received to perform two or more transactions. In response to the request, the transactions are performed using one or more resources. A first usage level of each resource is determined for a first transaction of the two or more transactions. A second usage level of each resource is also determined to attribute to the first transaction, wherein the second usage level is not directly associated with the first transaction.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

BRIEF DESCRIPTION OF THE DRAWINGS

FIG. 15A is a table having exemplary data relating to resource usage for a number of transactions.

FIG. 15B is a table having exemplary data relating to expected resource usage for a number of expected transactions.

DETAILED DESCRIPTION

Figure 1A:
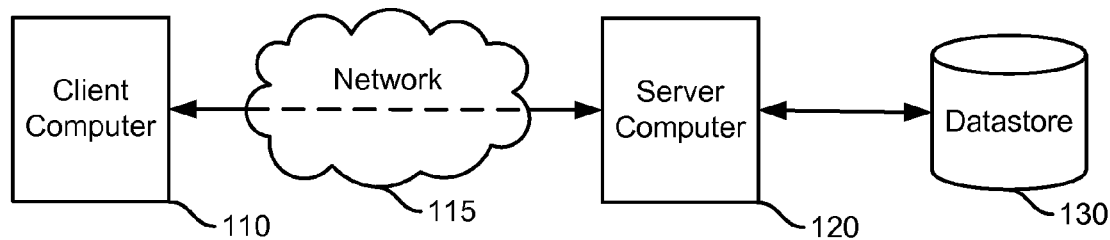
FIG. 1A is a block diagram of an embodiment of a client server system.

Capacity planning for a computing system is determined based on expected transaction load and the resource utilization for each expected transaction. The utilization of one or more resources is determined for individual transactions. The utilization of each resource may be based on non-transaction specific usage and transaction specific usage for each resource. The non-transaction specific resource usage is not caused by any particular transaction, but is programmatically attributed to one or more transactions which can be associated with the usage. Once the resource usage for each transaction is known, the expected resource usage may be determined for an expected quantity of each transaction. The actual resources needed to meet the total expected resource usage can then be determined.

Resources may include hardware, software, or hardware-software hybrid components of a computing system. Examples of resources include a central processing unit (CPU), memory such as RAM, DRAM, SRAM, or other memory, input and output bandwidth for a hard disk, network input and output bandwidth for communicating data (sending and receiving data) with a device or system external to a server (network bandwidth), and other computing system components. Resources are discussed in more detail below.

In some embodiments, the resource usage may be expressed in terms of a URL associated with the performed transaction. A transaction may be performed as part of processing or in response to a URL request. In some embodiments, the amount of a resource used for a transaction is determined by monitoring execution of an application that performs the transaction in response to a URL request. One or more requests may be a "real" customer request or a synthetic request.

In some embodiments, the application may perform the transaction by associating the transaction with a thread. Once a thread is associated with a transaction, the resource utilization associated with the thread is determined. Performance data associated with application runtime may be generated based on monitoring classes, methods, objects and other code within the application. The thread may handle instantiating classes, calling methods and other tasks to perform the transaction associated with the thread. The performance data is then reported, in some embodiments the data is aggregated, and the resulting data is analyzed to determine resource usage of one or more resources for one or more individual transactions.

In some embodiments, the resource utilization for a transaction may include the utilization directly related to the transaction and an amount of utilization not directly related to the transaction. The resource utilization directly related to a transaction may be the use of the resource that is directly caused or required by the transaction. For example, a conceptual transaction may require objects that are thirty bytes in length to be stored in RAM memory and require twenty-five CPU processing cycles to perform the entire transaction. The direct resource utilization for this conceptual transaction is thirty bytes of RAM memory and twenty-five CPU cycles.

Additional resource usage may be incurred indirectly from performance of one or more transactions or a process in which the transaction are performed. For example, a CPU may require thirty-five computer cycles to perform garbage collection. Though this CPU usage is not attributed to any one transaction, this non-transaction specific usage is indirectly associated with transactions that create and store data which eventually becomes "garbage" data. Non-transaction specific resource usage that is not a direct result of a transaction may be apportioned to the one or more transactions it is indirectly associated with. In some embodiments, the additional resource usage may be apportioned to one or more transactions based on the percentage load over a period of time in which the non-transaction specific usage occurred. In other embodiments, the non-transaction specific resource load may be apportioned by URL or in some other manner.

In some embodiments, non-transaction specific resource usage may be associated with a computer process which performs background or overhead resource usage while performing the transactions. For example, a CPU overhead usage may include garbage collection, managing thread and connection pools, time spent doing class loading and method compilation and de-compilation, and other tasks. The overhead may be spent as part of a process or in some other manner. In some embodiments, transactions may be performed as part of a Java Virtual Machine (JVM) process. However, transactions can be performed as part of other processes or on other platforms as well, such as Microsoft's .NET or any managed environment where transactions execute on threads and code can be instrumented. The discussion below references transaction monitoring as part of a JVM process for purposes of example only.

FIG. 1A is a block diagram of an embodiment of a client server system. FIG. 1A includes client computer 110, network 115, server computer 120 and data store 130. Client computer 110 and server computer 120 communicate over network 115. Network 115 may be implemented as a private or public network. In some embodiments, network 115 may be implemented as the Internet.

Client computer 110 may be implemented as any computing device capable of communicating with server computer 120. Server computer 120 receives and processes requests from client computer 110. Processing a request may include performing a transaction. When the transaction is complete, server computer 120 generates and sends a response to client computer 110. Server computer 120 may be implemented by one or more servers. In some embodiments, server 120 is a web server. In this case a request received by server computer 120 is a URL request. Server computer 120 may communicate with data store 130 to process requests from client 110 and for other communications.

Figure 1B:
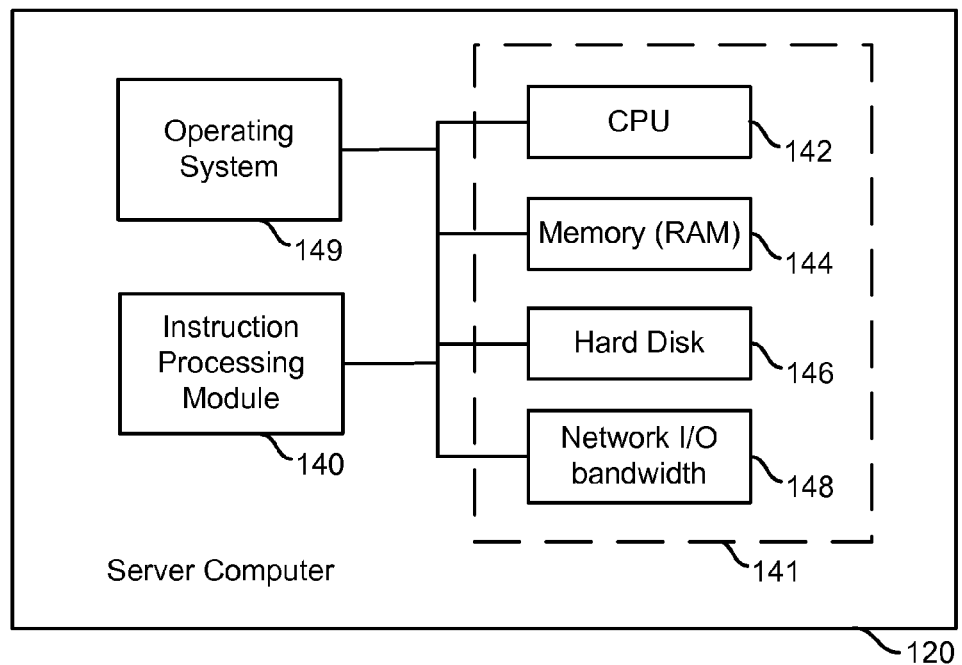
FIG. 1B is a block diagram of an embodiment of a server computer.

FIG. 1B is a block diagram of an embodiment of conceptual server computer 120. In some embodiments, server computer 120 of FIG. 1B provides more detail for server computer 120 of FIG. 1A. Server computer 120 includes operating system 149, instruction processing module 140 and resources 141. Resources 141 includes central processing unit (CPU) 142, memory 144, hard disk 146 and network input and output bandwidth (network I/O bandwidth) 148. Each of resources 142-148 may be used to process network requests, including URL requests, received over network 115 and other transactions by server computer 120. In some embodiments, instruction processing module 140 may access any of resources 142-148 while processing instructions to perform a transaction in response to a URL request. CPU 142, memory 144, hard disk 146 and network I/O bandwidth 148 may each communicate with operating system 149 and instruction processing module 140.

CPU 142 may be implemented by one or more computer processors on server computer 120. When processing a transaction, the level of use or utilization of CPU 142 may be measured in terms of processing time (in terms of seconds, milliseconds, microseconds, or some other unit) or computer cycles used to perform the transaction.

Memory 144 is a resource having a finite amount of memory space. Memory 144 may include one or more types of memory, such as RAM, DRAM, SRAM or some other type of memory. Memory 144 can be used to store objects and other data allocated while processing a transaction, storing data during a computer process (such as Java Virtual Machine process), and other data.

Hard disk 146 is a resource implemented as hardware and code for reading from and writing to a hard disk. Hard disk 146 may include hard disk writing and reading mechanisms, code associated with the hard disk and optionally other code and hardware used to read and write to a hard disk on server computer 120. Hard disk 146 has a finite reading and writing bandwidth and is utilized by read and write methods, and optionally other sets of code, which perform hard disk read and write operations. The usage of a hard disk resource may be expressed as a bandwidth for writing to and reading from the disk per second, such as seven thousand bytes per second.

Network I/O bandwidth 148 is implemented as code and hardware that operates to communicate to machines and devices external to server 120. For example, network I/O bandwidth 148 may use a number of sockets to communicate with data store 130 and/or other machines external to server computer 120. There is a finite amount of network bandwidth for sending and receiving data over network 115 and a finite number of available sockets (i.e., network connections) to communicate to other devices. The usage of network I/O bandwidth may be expressed as a number of bytes sent and received per second, such as ten thousand kilobytes per second.

Resources 142-148 are just examples of elements that may be used to process a transaction. Other resources, computing components, and other hardware and software elements may be used to perform a transaction. The level of use and/or utilization of these other hardware and software elements (on one or more servers) may be determined as well.

Figure 1C:
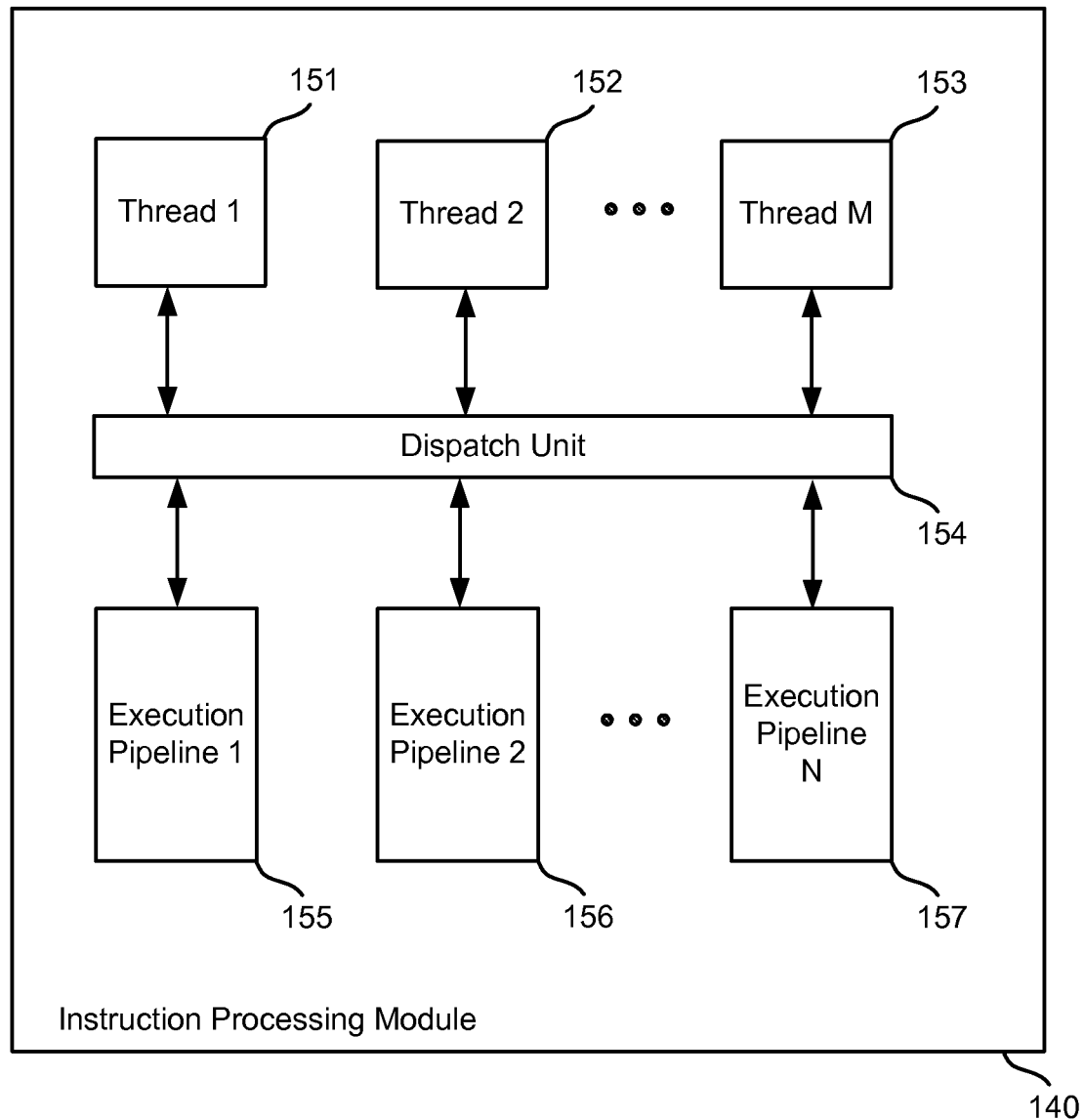
FIG. 1C is a block diagram of an embodiment of an instruction processing module.

FIG. 1C is a block diagram of an embodiment of instruction processing module 140. In some embodiments, instruction processing module 140 of FIG. 1C provides more detail for instruction processing module 140 of FIG. 1B. It should be noted that FIG. 1C is a conceptual illustration of a system for processing instructions by providing a simplified block diagram of an instruction processing system. Additional components used to process instructions may be used but are not illustrated for purposes of discussion.

Instruction processing module 140 includes threads 151, 152 and 153, dispatch unit 154 and execution pipeline 155, 156 and 157. Each of threads 151-153 may contain instructions to be processed as part of performing a transaction. In some embodiments, each thread is associated with a URL and implemented or controlled by a thread object. A thread class may be instantiated to generate the thread object. Dispatch unit 154 may dispatch instructions from one of threads 151-153 to one of available pipelines 155-157. Execution pipelines 155-157 may execute instructions provided by a thread as provided to the pipeline by dispatch unit 154. While executing instructions in an execution pipeline, the pipeline may access any of resources 142-148.

In one embodiment, the technology herein can be used to monitor behavior of an application on an application server (or other server) using bytecode instrumentation. The technology herein may also be used to access information from the particular application. To monitor the application, an application management tool may instrument the application's object code (also called bytecode).

Figure 2A:
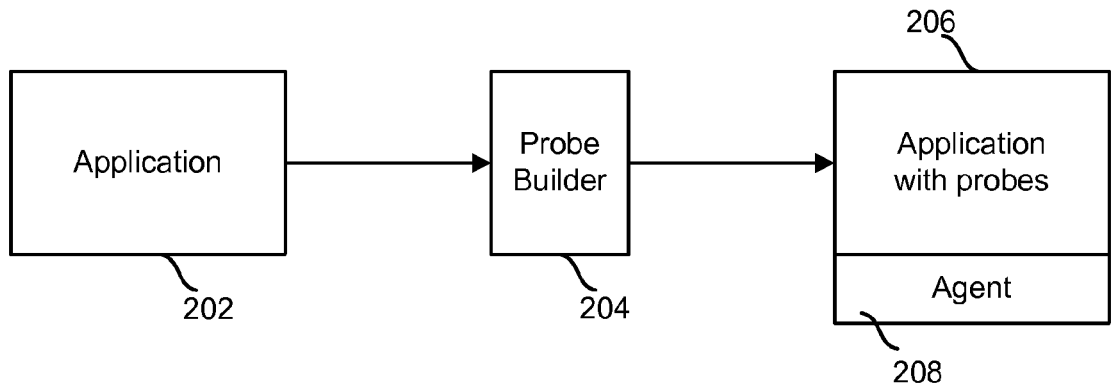
FIG. 2A is a block diagram of a system describing how byte code is instrumented.

FIG. 2A depicts an exemplar process for modifying an application's bytecode. FIG. 2A shows Application 202, Probe builder 204, Application 115 with probes and Agent 116. Application 115 includes probes used to access information from the application, and application 202 is the application before the probes are added. Application 202 can be a Java application or a different type of application.

Probe builder 204 instruments (e.g. modifies) the bytecode for Application 202 to add probes and additional code to Application 202 in order to create Application 115. The probes may measure specific pieces of information about the application without changing the application's business logic. Probe builder 204 also generates Agent 116. Agent 116 may be installed on the same machine as Application 115 or a separate machine. Once the probes have been installed in the application bytecode, the application is referred to as a managed application. More information about instrumenting byte code can be found in U.S. Pat. No. 6,260,187 "System For Modifying Object Oriented Code" by Lewis K. Cirne, incorporated herein by reference in its entirety.

In one embodiment, the technology described herein doesn't actually modify source code. Rather, the present invention modifies object code. The object code is modified conceptually in the same manner that source code modifications are made. More information about such object code modification can be found in U.S. patent application Ser. No. 09/795,901, "Adding Functionality To Existing Code At Exits," filed on Feb. 28, 2001, incorporated herein by reference in its entirety.

Figure 2B:
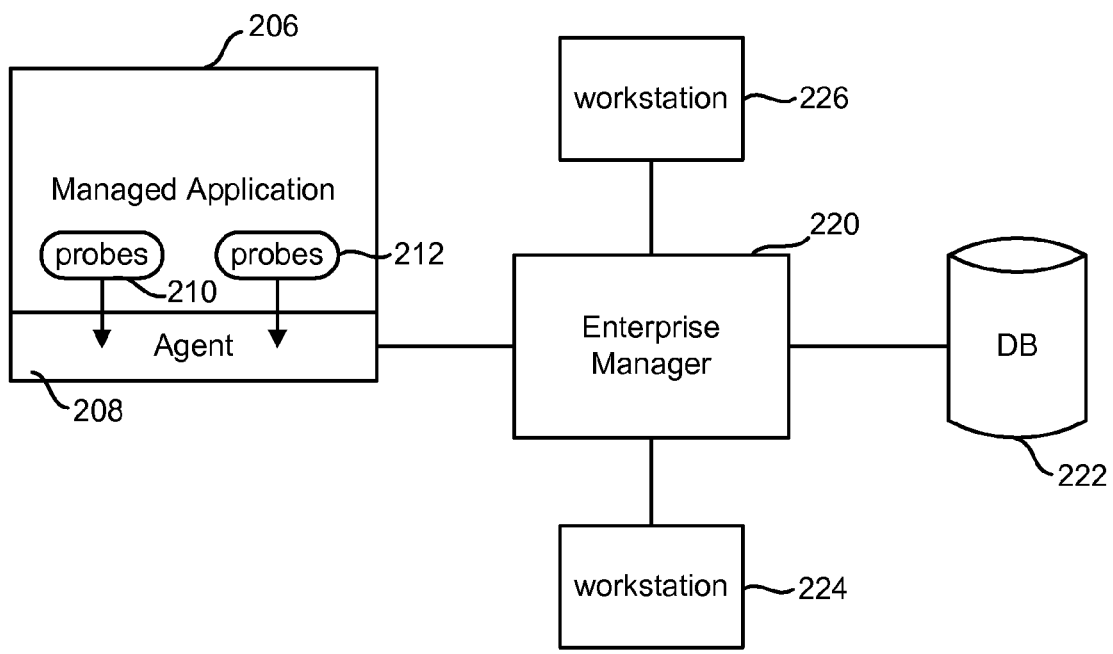
FIG. 2B is a block diagram of a system for monitoring an application.

FIG. 2B is a block diagram of a system for monitoring an application. In one embodiment, the block diagram of FIG. 2B provides more information for managed application 115 and application monitoring system 117 of FIG. 1.

FIG. 2B is a conceptual view of the components of the application performance management tool. In addition to managed application 115 with probes 206 and 208, FIG. 2B also depicts Enterprise manager 210, database 216, workstation 212 and workstation 214. As a managed application runs, probes (e.g. 206 and/or 208) relay performance data to Agent 116. In one embodiment, probes 206 and 208 may be implemented in objects and other code that write data, change data or otherwise cause the state of an application server to change. Agent 116 then collects, summarizes and sends the data to Enterprise Manager 210.

Enterprise Manager 210 receives performance data from managed applications via Agent 116, runs requested calculations, makes performance data available to workstations 212-

214 and optionally sends performance data to database 216 for later analysis. The workstations (e.g. 212 and 214) are the graphical user interface for viewing performance data. The workstations are used to create custom views of performance data which can be monitored by a human operator. In one embodiment, the workstations consist of two main windows: a console and an explorer. The console displays performance data in a set of customizable views. The explorer depicts alerts and calculators that filter performance data so that the data can be viewed in a meaningful way. The elements of the workstation that organize, manipulate, filter and display performance data include actions, alerts, calculators, dashboards, persistent collections, metric groupings, comparisons, smart triggers and SNMP collections. In some embodiments, other the natural language tool can be implemented in the console window, explorer window and other windows within an interface.

In one embodiment of the system of FIG. 2B, each of the components is running on different machines. That is, workstation 212 is on a first computing device, workstation 214 is on a second computing device, Enterprise manager 210 is on a third computing device, and Managed Application 115 is running on a fourth computing device. In another embodiment, two or more (or all) of the components are operating on the same computing device. For example, Managed Application 115 and Agent 116 may be on a first computing device, Enterprise manager 210 on a second computing device and a workstation on a third computing device. Alternatively, all of the components of FIG. 2B can run on the same computing device. Any or all of these computing devices can be any of various different types of computing devices, including personal computers, minicomputers, mainframes, servers, handheld computing devices, mobile computing devices, etc. Typically, these computing devices will include one or more processors in communication with one or more processor readable storage devices, communication interfaces, peripheral devices, etc. Examples of the storage devices include RAM, ROM, hard disk drives, floppy disk drives, CD ROMS, DVDs, flash memory, etc. Examples of peripherals include printers, monitors, keyboards, pointing devices, etc. Examples of communication interfaces include network cards, modems, wireless transmitters/receivers, etc. The system running the managed application can include a web server/application server. The system running the managed application may also be part of a network, including a LAN, a WAN, the Internet, etc. In some embodiments, all or part of the invention is implemented in software that is stored on one or more processor readable storage devices and is used to program one or more processors.

Figure 2C:
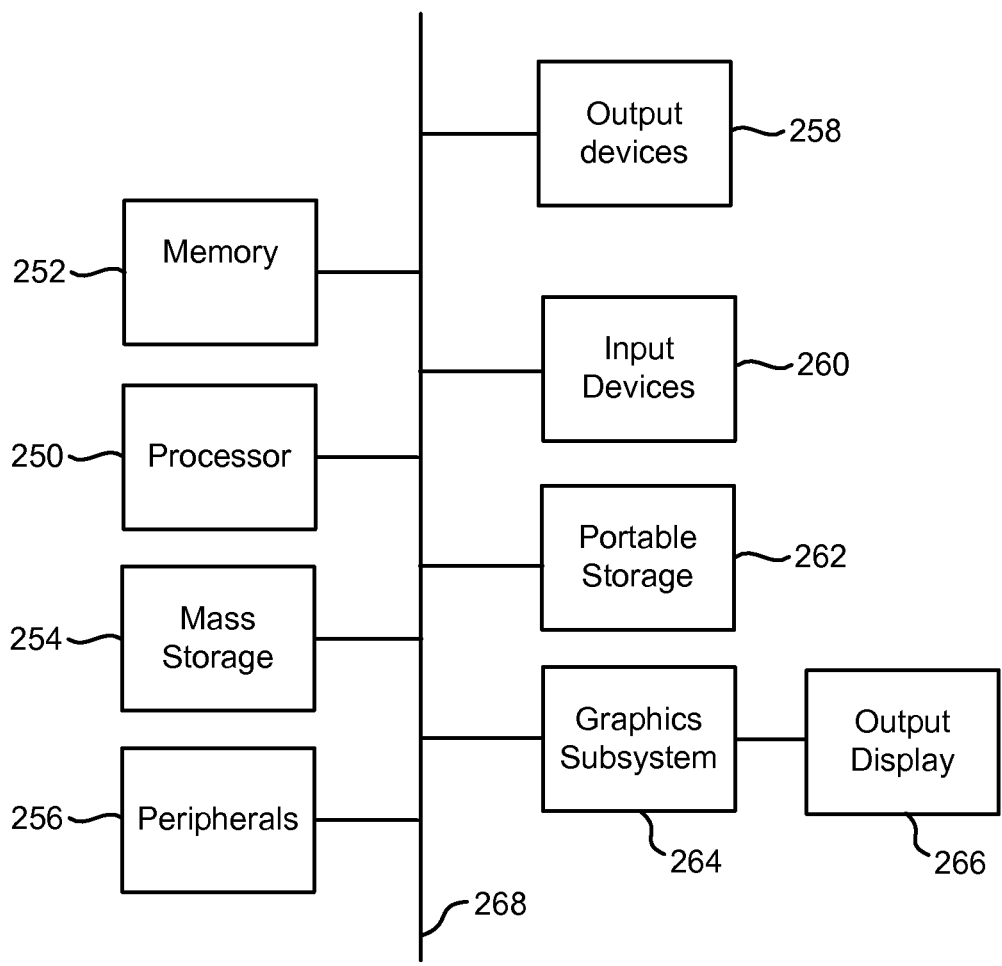
FIG. 2C illustrates a computing system in which the systems of the present invention may be implemented.

FIG. 2C illustrates a computing system in which the system of the present technology may be implemented. In some embodiments, the computing system of FIG. 2C may be used to implement client computer 110, server computer 120, data store 130, workstations 224 and 225 and database 222.

The computer system of FIG. 2C includes one or more processors 250 and main memory 252. Main memory 252 stores, in part, instructions and data for execution by processor unit 250. If the system of the present invention is wholly or partially implemented in software, main memory 252 can store the executable code when in operation. The system of FIG. 2C further includes a mass storage device 254, peripheral device(s) 256, user input device(s) 260, output devices 258, portable storage medium drive(s) 262, a graphics subsystem 264 and an output display 266. For purposes of simplicity, the components shown in FIG. 2C are depicted as being connected via a single bus 268. However, the components may be connected through one or more data transport means. For example, processor unit 250 and main memory 252 may be connected via a local microprocessor bus, and the mass storage device 254, peripheral device(s) 256, portable storage medium drive(s) 262, and graphics subsystem 64 may be connected via one or more input/output (I/O) buses. Mass storage device 254, which may be implemented with a magnetic disk drive or an optical disk drive, is a non-volatile storage device for storing data and instructions for use by processor unit 250. In one embodiment, mass storage device 254 stores the system software for implementing the present invention for purposes of loading to main memory 252.

Portable storage medium drive 262 operates in conjunction with a portable non-volatile storage medium, such as a floppy disk, to input and output data and code to and from the computer system of FIG. 2C. In one embodiment, the system software for implementing the present invention is stored on such a portable medium, and is input to the computer system via the portable storage medium drive 262. Peripheral device(s) 256 may include any type of computer support device, such as an input/output (I/O) interface, to add additional functionality to the computer system. For example, peripheral device(s) 256 may include a network interface for connecting the computer system to a network, a modem, a router, etc.

User input device(s) 260 provides a portion of a user interface. User input device(s) 260 may include an alpha-numeric keypad for inputting alpha-numeric and other information, or a pointing device, such as a mouse, a trackball, stylus, or cursor direction keys. In order to display textual and graphical information, the computer system of FIG. 2C includes graphics subsystem 264 and output display 266. Output display 266 may include a cathode ray tube (CRT) display, liquid crystal display (LCD) or other suitable display device. Graphics subsystem 264 receives textual and graphical information, and processes the information for output to display 266. Additionally, the system of FIG. 2C includes output devices 258. Examples of suitable output devices include speakers, printers, network interfaces, monitors, etc.

The components contained in the computer system of FIG. 2C are those typically found in computer systems suitable for use with the present invention, and are intended to represent a broad category of such computer components that are well known in the art. Thus, the computer system of FIG. 2C can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

Figure 3:
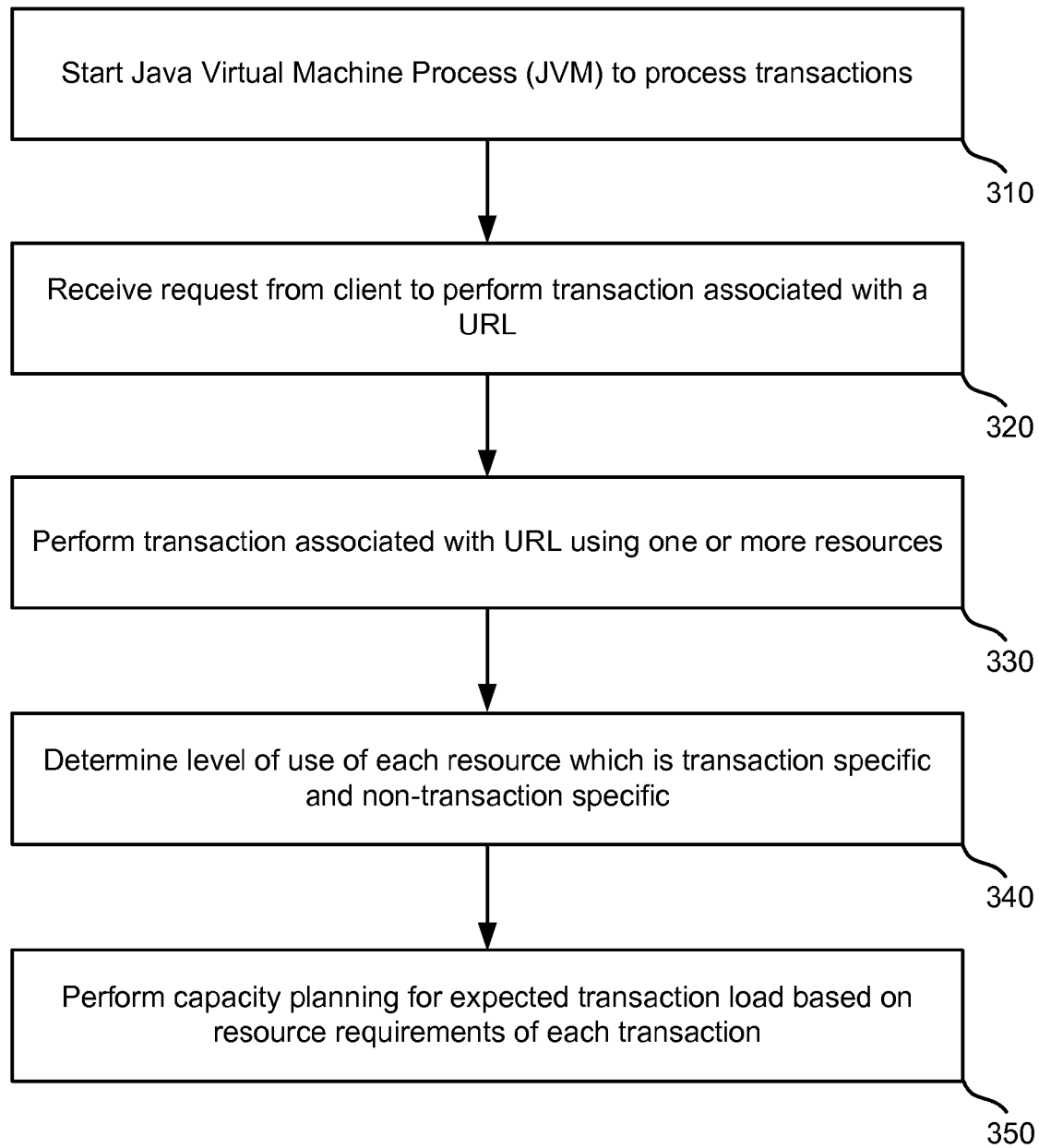
FIG. 3 is a flowchart of an embodiment of a process for performing capacity planning.

FIG. 3 is a flowchart of an embodiment of a process for performing capacity planning. First, a Java Virtual Machine (JVM) process is started to process transactions at step 310. The JVM process may be a runtime program in which one or more applications that reside on server 120 are executed. In some embodiments, another type of computer process is started. In some embodiments, an application is started without being part of another computer process. Next, a request is received from a client by server computer 120 to perform a transaction associated with a URL at step 320. In some embodiments, the request is received by another server or machine and causes an invocation of an application on server computer 120. The request (or invocation) received by server computer 320 may be forwarded to managed application 206. In some embodiments, the request is a URL request received over network 115 from client 110. In some embodiments, the request is received from some other source external or internal to server 120.

Next, a transaction associated with the URL is performed using one or more resources at step 330. In some embodiments, performing a transaction may include initiating the transaction, assigning the transaction to a thread and performing the transaction. The resources used to perform a transaction may include CPU 142, memory 144, hard disk 146, network I/O bandwidth 148, and/or other resources or computing components. More detail regarding performing a transaction associated with a URL is discussed with respect to FIG. 4.

The level of use of each of resource which is transaction specific and non-transaction specific is determined for the performed transaction at step 340. The level of use and/or utilization of each resource for a transaction may be viewed as the actual resource usage by the transaction and non-transaction specific resource usage. For example, non transaction specific CPU usage may include computer cycles used to collect and process garbage. Determining the utilization and/or level of use of one or more resources which is transaction specific and non-transaction specific is discussed in more detail below with respect to FIGS. 5-13.

After determining the resource usage for a transaction, capacity planning may be performed for an expected transaction load based on resource requirements of each transaction expected at step 350. The step of performing capacity planning may include determining the hardware required to meet a forecasted load based on the expected transactions and resources required per transaction. As discussed above, the resources required per transaction may take into account the actual resource amount used by the transaction and a level of resource usage attributed to a transaction which is not transaction specific. In some embodiments, the capacity planning is performed based on the resources required for one or more URL request. Performing capacity planning for an expected load based on resource requirements for a transaction and/or URL request is discussed in more detail below with respect to FIG. 14.

Figure 4:
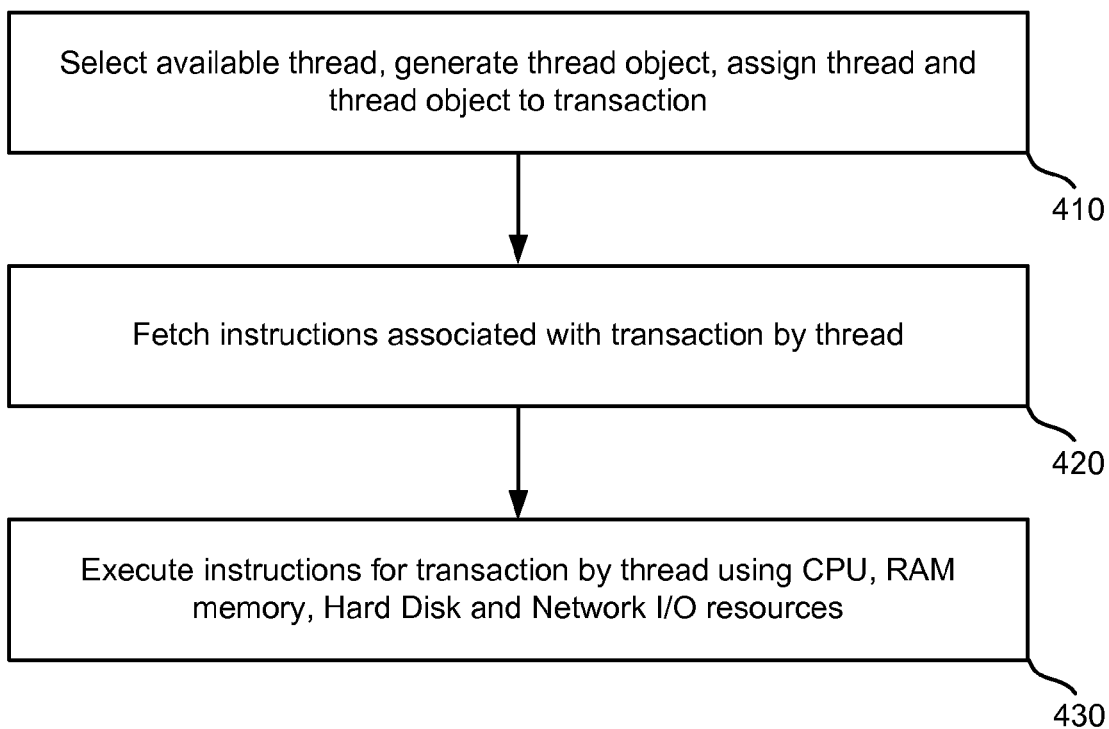
FIG. 4 is a flowchart of an embodiment of a process for performing a transaction using one or more resources.

FIG. 4 is a flowchart of an embodiment of a process for performing a transaction using one or more resources. In one embodiment, the process of FIG. 4 provides more detail for step 330 of the process of FIG. 3. First, an available thread is selected and assigned to a transaction at step 410. The thread may be selected from a thread pool by a thread pool manager in response to receiving the URL request or receiving some other invocation of an application at server computer 120. A thread pool and thread pool manager are not illustrated for purposes of simplification. The transaction is then assigned to the selected thread. In one embodiment, the URL associated with the transaction is provided and stored with a thread object associated with the selected thread. A thread object is instantiated from a thread class and generated for each thread used to process a transaction.

A thread fetches instructions associated with the transaction at step 420. Next, the thread executes instructions for the transaction using resources at step 430. The resources may include CPU 142, memory 144, hard disk 146, network I/O bandwidth 148 and/or other resources or computer components. The instructions may be executed by instruction processing module 140 in communication with resources 141. For example, instructions from one of threads 151-153 may be processed in one of execution pipelines 155-157.

Figure 5:
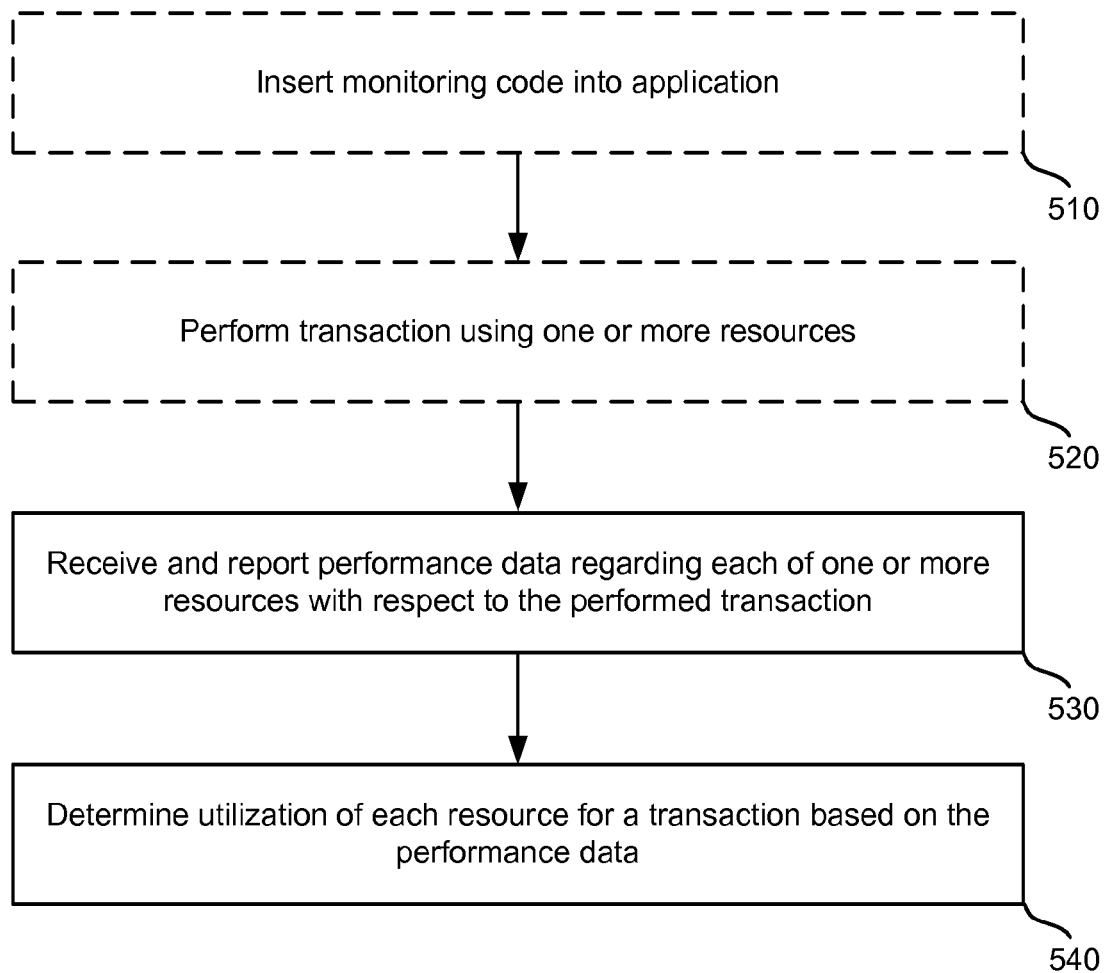
FIG. 5 is a flowchart of an embodiment of a process for determining the utilization of a resource for a transaction.

FIG. 5 illustrates a flowchart of an embodiment of a process for determining the utilization of a resource for a transaction. In some embodiments, the process of FIG. 5 provides more detail for step 340 of FIG. 3. Steps 510 and 520 do not correspond to step 340 of FIG. 3 as indicated by the dashed lines comprising these steps. Rather, they are included in the process of FIG. 5 to provide context for generalized steps 530 and 540. Steps 530 and 540 provide more detail of step 340 of FIG. 3. First, monitoring code is inserted into an application at step 510. Inserting monitoring code into an application may be done using byte code instrumentation as discussed above with respect to FIGS. 2A-2B or in some other manner. One or more transactions are then performed at step 520. The transactions may be performed as discussed with respect to step 430 of the process of FIG. 4.

Performance data (or application runtime data) is received and reported regarding performed transaction and the one or more resources used to perform the transactions at step 530. The performance data may be reported during or after a transaction is performed at step 520. In one embodiment, the performance data is received by agent 208 from probes 210 and 212. The probes may be inserted as monitoring code into application 206 at step 510. In some embodiments, the performance data may be reported to enterprise manager 220 by agent 208. This may be done as the data becomes available or periodically, for example every fifteen seconds.

In some embodiments, the performance data (application runtime data) received and reported at step 530 may contain information for both transaction specific resource usage and data regarding non-transaction specific resource usage. For example, the non-transaction specific performance data reported at step 530 may include CPU time for a JVM process used to process transactions but not associated with a specific transaction (for example, total CPU time for the group of transactions which includes garbage collection CPU time, garbage CPU time only, and so forth). Additionally, the non-transaction specific resource usage reported may also include the total memory space, hard disk bandwidth and network bandwidth attributed to processing transactions by a JVM process for a period of time associated with one or more transactions. In some embodiments, non-transaction specific resource usage data may be retrieved from an operating system of a machine that contains or has information regarding the resource.

The utilization (or level of use) of each resource for a transaction is determined based on performance data at step 540. In some embodiments, the utilization of a resource for a transaction is a measure of how much the resource is used or how much of the resource is required for a particular transaction. As discussed above, the usage of a resource required for a particular transaction may be determined from transaction specific performance data as well as non-transaction specific data. Steps 530 and 540 are discussed in more detail with respect to FIGS. 6-13.

FIGS. 6-13 illustrate methods for determining the usage of a resource for a particular transaction. In particular, FIGS. 6-7B relate to CPU usage, FIGS. 8-9 relate to memory usage, FIGS. 10-11 relate to hard disk usage, and FIGS. 12-13 relate to network I/O bandwidth usage.

Figure 6:
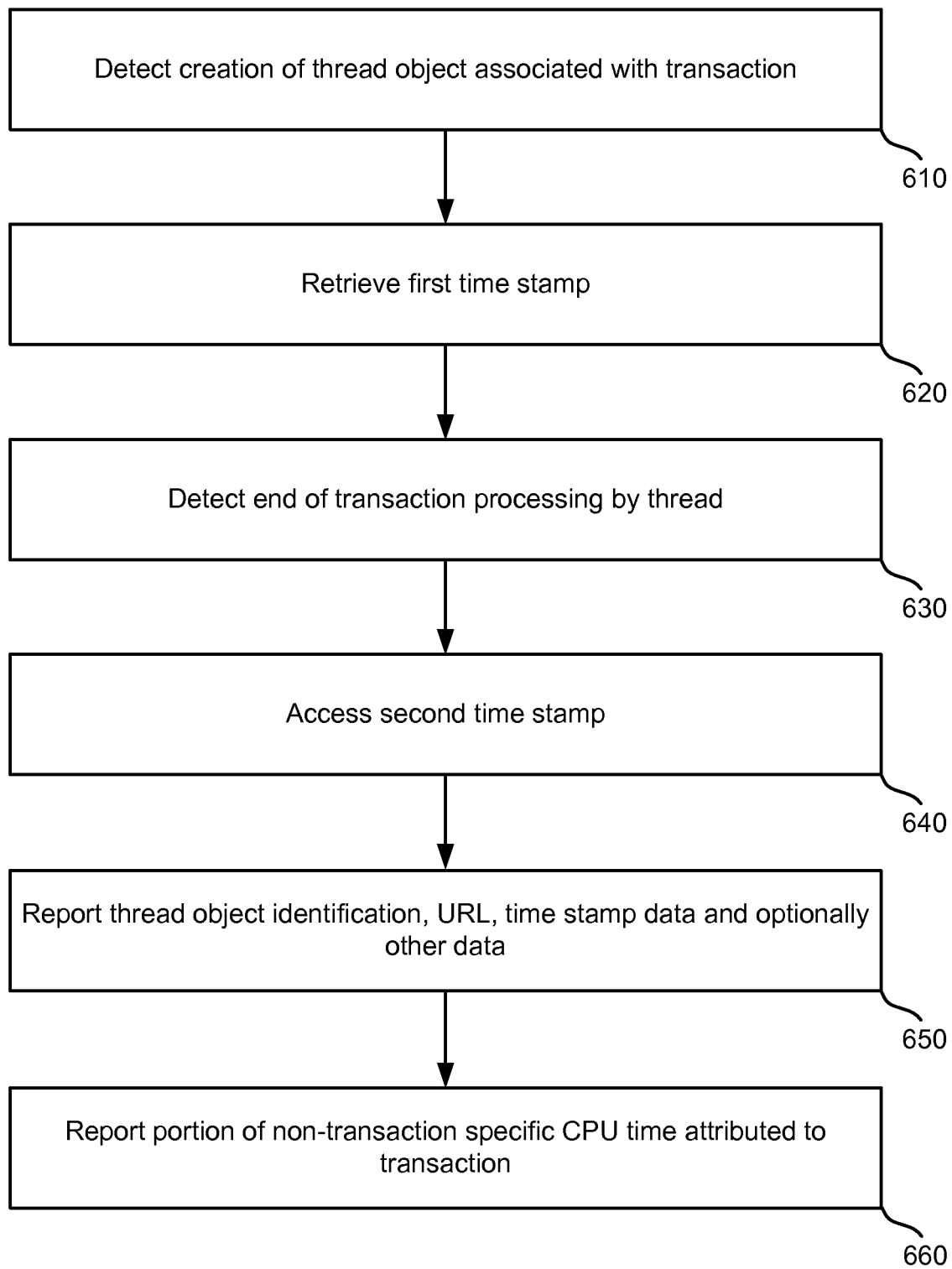
FIG. 6 is a flowchart of an embodiment of a process for determining the level of CPU usage for a transaction.

FIG. 6 is a flowchart of an embodiment of a process for determining a level of CPU usage for a transaction. In some embodiments, the process of FIG. 6 provides more detail for step 340 of the process of FIG. 3. CPU usage may be measured in units of time or cycles. For example, a resource may require a CPU for one millisecond. The unit of time may optionally be converted to computer cycles. For example, one second may be equivalent to 1,000 computer cycles. Determining what units to measure CPU usage in and the particular time-to-cycles conversion factor may be determined based on the particular system or user preference. For purposes of discussion, CPU usage will be discussed below in units of time.

Creation of a thread object associated with a transaction is detected at step 610. In some embodiments, code inserted into a thread class may report when the class is instantiated and a thread object is created. A first time stamp is then retrieved at step 620. The first time stamp is the time at which the thread object is instantiated at step 610.

The end of transaction processing by the created thread is detected at step 630. When a thread object completes processing of a transaction, code inserted into the thread object determines that the transaction is complete. A second time stamp is then accessed at step 640. The second time stamp is associated with the end of the transaction determined at step 630.

Data including a thread object identifier, a URL associated with the thread object, and time stamp data is reported at step 650. The data may be reported by code inserted into the thread object by the thread class (in which monitoring code was inserted at step 510) to agent 208. The time stamp data may be reported as the start and end time of the thread, the difference between the start and end times, or both. In some embodiments, a thread such as a Java thread may handle a single transaction. Thus, the CPU usage directly attributed to the transaction and corresponding URL is the difference between the thread start time and thread end time. In some embodiments, agent 208 may aggregate the data and forward the aggregated data to enterprise manager 220. In some embodiments, additional data may also be reported, such as the thread class, and method used to create the thread object, as well as other data.

CPU usage for a transaction performed in response to a URL request or other request can be measured in other ways as well. For example, monitoring code may retrieve CPU usage data from system calls that provide CPU consumption statistics to a thread. In some embodiment, a thread object may send or otherwise initiate a system call requesting CPU consumption statistics. In some embodiments, the system calls are initiated from a source other than a thread. The operating system, CPU or some other source may then provide CPU data to the thread through one or more system calls. The CPU data may include the percentage of CPU used by the particular thread, the number of CPU cycles used by the thread, and/or other CPU consumption statistics. In some embodiments, the monitoring code traces system calls in which the CPU consumption statistics are provided to a thread. In some embodiments, CPU usage may be measured in cycles, duration, or percentage utilization. With respect to percentage utilization, the total CPU capacity may be 100%, wherein the goal of an administrator may be to keep the percentage utilization at some level or lower, such as 60% or 80% or lower. In some embodiments, the percent utilization of a transaction may be determined by retrieving the percent utilization of the corresponding thread that executes a transaction from the operating system.

After reporting CPU usage directly attributed to the transaction, non-transaction specific CPU time data may be reported at step 660. The portion of the non-transaction specific CPU time includes CPU overhead attributed to the transaction that is not requested by the thread object. A level of "overhead" may be determined for each resource that for which usage or bandwidth is attributed to one or more transactions. For example, CPU overhead may include performing garbage collection while processing a number of transactions, managing thread and connection pools, and time spent in the JVM doing class loading and method compilation and de-compilation, and other tasks. The non-transaction specific CPU time may be apportioned to one or more transactions by the percent load of time required by each individual transaction. Determining and reporting a portion of non-transaction specific CPU time attributed to a particular transaction is discussed in more detail below with respect to FIG. 7.

Figure 7A:
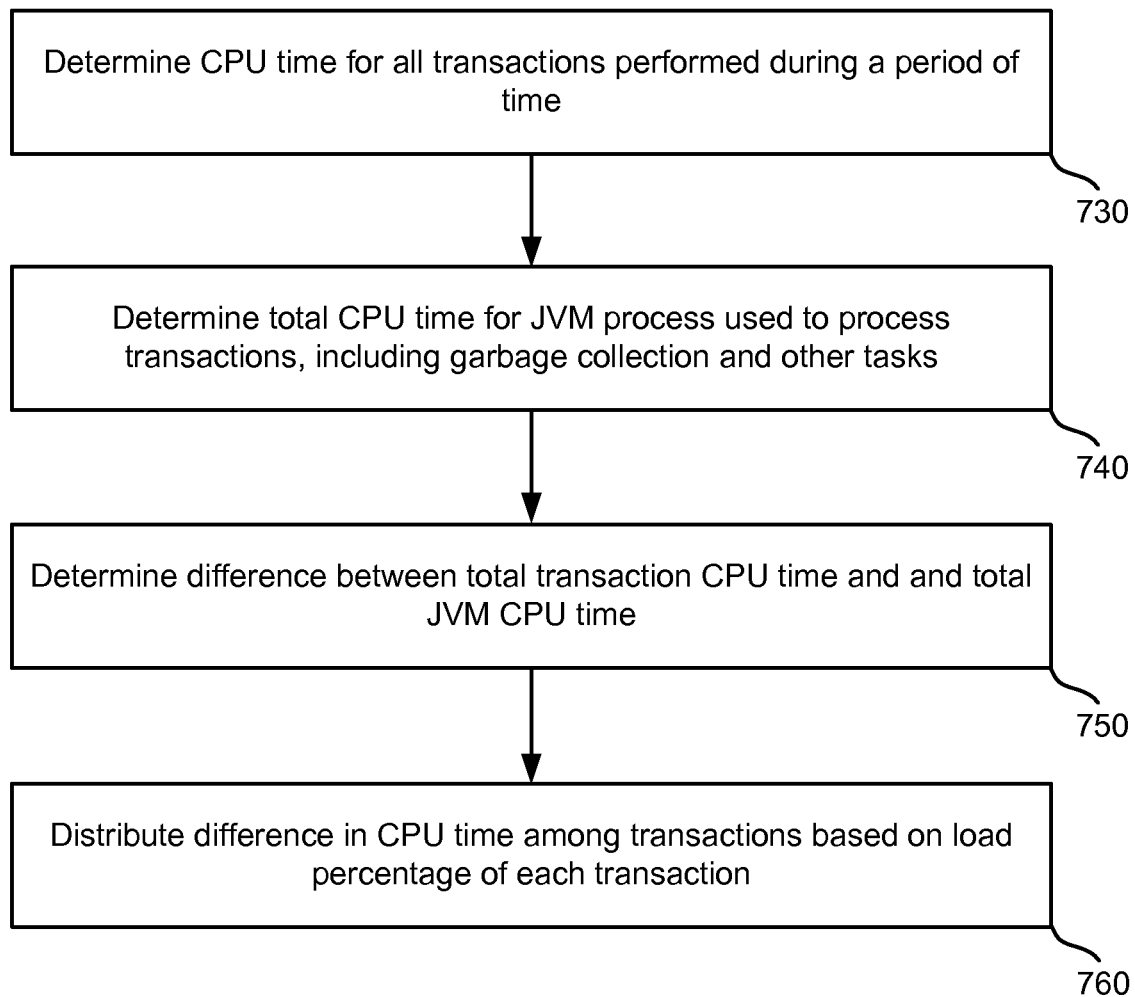
FIG. 7A is a flowchart of an embodiment of a process for determining non-transaction specific CPU usage to attribute to a transaction.

FIG. 7A is a flowchart of an embodiment of a process for determining non-transaction specific CPU usage to attribute to a transaction. In some embodiments, the process of FIG. 7A provides more detail for step 660 of FIG. 6. The total CPU time is determined for the transactions performed during a period of time at step 730. The period of time may be a set by a user, the length of a JVM process or other process, or some other period of time. In some embodiments, the time period may be a learning period during which the resource usage for each transaction is monitored. In general, the learning period is flexible for any resource, and could be in terms of minutes, hours, days, or some other period of time. In some embodiments, a time period may be a number of hours, days, weeks or some other time period. In some embodiments, setting a short time period (less than an hour) may not allow enough time for a desired variety of customer transactions and non-transaction specific CPU usage to be observed and reported. The CPU time for all transactions may include sum of the times for each transaction and transactions processed by shared threads. In one embodiment, the total CPU time is the sum of the times for each transaction performed as part of a JVM process, or other computer process, or during a specific time period of a JVM process.

Next, the total CPU time for the JVM process used to process the transactions is determined at step 740. The total JVM process CPU time may be the time for the entire JVM process or for a selected period discussed with respect to step 730. The CPU usage during the JVM process may include CPU time used to perform the transactions and other tasks, such as garbage collection. When the CPU usage is a length of a JVM process, the time of the JVM process CPU time may be determined by retrieving the data from operating system 149, software associated with CPU 142 or from some other source. When the CPU usage is the number of computing cycles associated with a JVM process, the number of cycles may be retrieved from operating system 149 or some other module on server 120.

The difference between the total transaction CPU time and the JVM process CPU time is determined at step 750. To determine the difference, the total transaction CPU time is subtracted from the JVM process CPU time. Next, the difference in the CPU time determined at step 750 is distributed among transactions that occurred during the JVM process based on the load percentage of each transaction at step 760. The transaction load percentage is determined by dividing the transaction CPU time by the total transaction CPU time. The transaction's portion of the extra CPU time is then determined as the load percentage for the transaction multiplied by the extra CPU time. Step 760 is discussed in more detail with respect to the process of FIG. 7B.

Figure 7B:
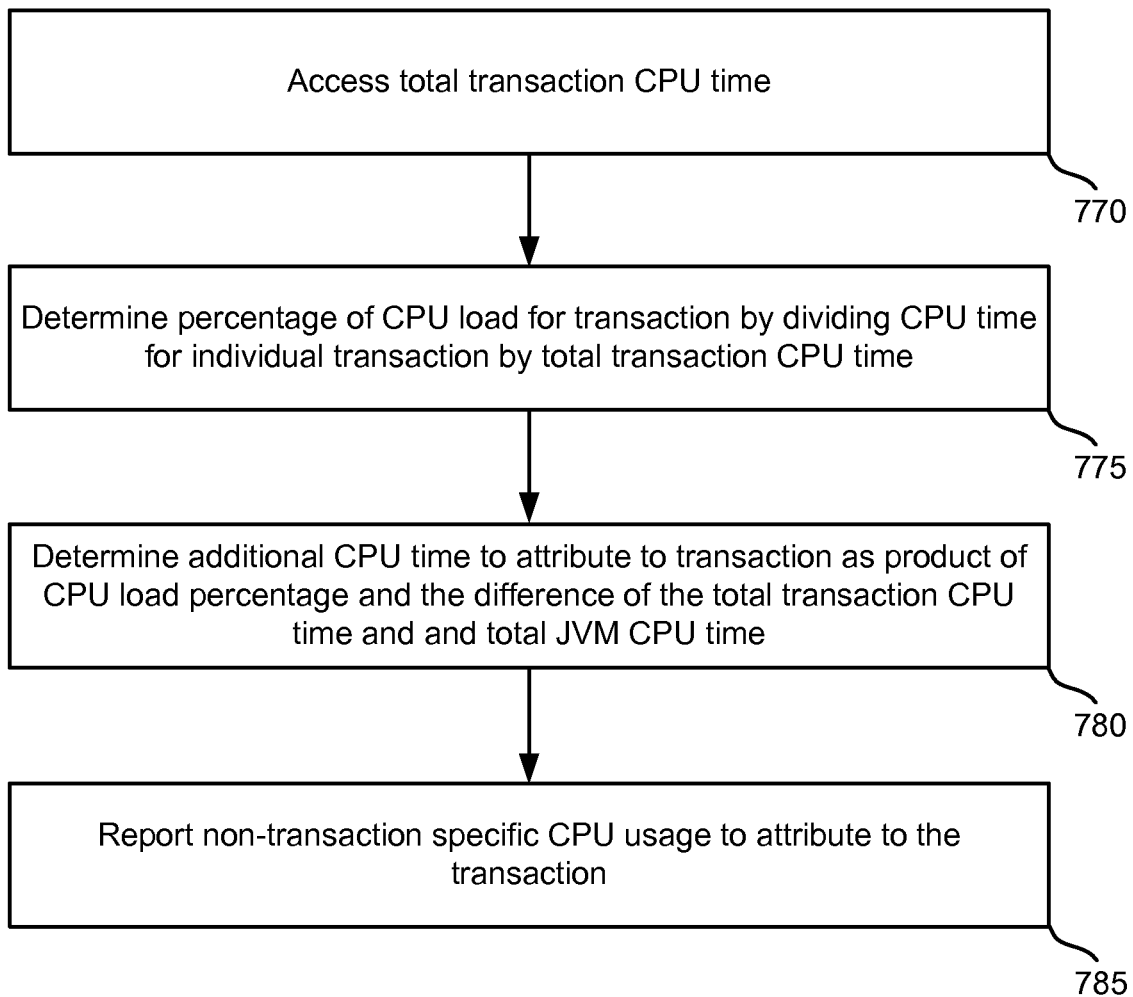
FIG. 7B is a flowchart of an embodiment of a process for calculating a percentage of CPU time for a percentage of the transaction.

FIG. 7B is a process for determining a transaction CPU load percentage. FIG. 7B provides more detail for step 760 of the process of FIG. 7A. The process of FIG. 7B may be generalized to determine the transaction use load percentage of other resources as well, as discussed in FIGS. 9, 11 and 13.

First, the total transaction CPU time is accessed at step 770. The CPU load percentage for a transaction is determined by dividing the CPU time for the individual transaction by the total transaction CPU time at step 775. For example, consider transactions T1, T2, and T3. T1 uses five milliseconds of a CPU resource, T2 uses six milliseconds of a CPU resource and T3 uses four milliseconds of a CPU resource. The total transaction CPU time is determined as the sum of the CPU time for the three transactions, or fifteen milliseconds (5 ms+6 ms+4 ms=15 ms). The load percentage for transaction T1 is determined as five milliseconds divided by fifteen milliseconds, or 33% (5/15=⅓).

The additional CPU time to attribute to the transaction is determined by the product of the CPU load percentage for the transaction and the difference between the total transaction CPU time and the total JVM process time at step 780. Assume the JVM process has a total CPU time of eighteen milliseconds. Accordingly, the non-transaction specific CPU time is determined as fifteen milliseconds subtracted from the total JVM process CPU time of eighteen milliseconds, resulting in three milliseconds (18−15=3). The portion of CPU time apportioned to transaction T1 is 33% times three milliseconds, or one millisecond (⅓×3=1). The additional non-transaction specific CPU time is then reported at step 785. The non-transaction specific CPU time may be reported separately or together with the transaction specific CPU time reported in step 650 of the process of FIG. 6.

Figure 8:
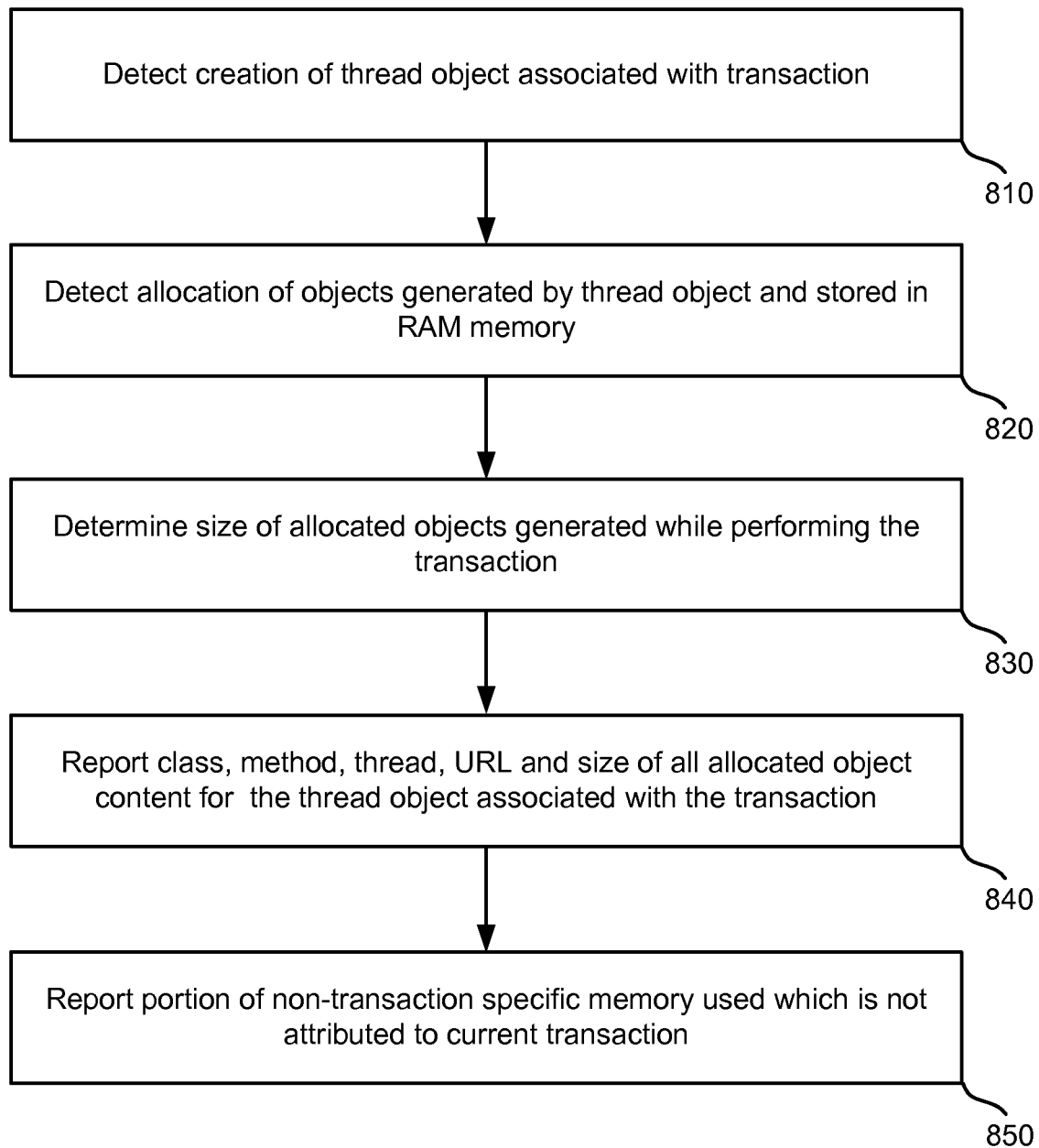
FIG. 8 is a flowchart of an embodiment of a process for determining the usage of a memory resource by a transaction.

FIG. 8 is a flowchart of an embodiment of a process for determining the usage of a memory resource by a transaction. In some embodiments, the process of FIG. 8 provides more details for step 340 of the process of FIG. 3 with respect to memory 144. In one embodiment, memory usage may be considered in terms of size of memory used, including RAM, DRAM, SRAM and other memory. In general, threads may create objects while performing a transaction. The memory usage for transaction may be expressed as the size of memory required to contain the objects allocated by the thread performing the transaction.

First, creation of a thread object associated with a transaction is detected at step 810. Detecting the creation of the thread object at step 810 is similar to detecting a thread object created via instantiation of a thread class discussed with respect to step 610 of FIG. 6. Next, the allocation of objects generated by a thread and stored in memory 144 as part of performing a transaction is detected at step 820. The thread associated with the transaction will create objects and save them to memory 144. Creation of these objects is detected while performing the transaction.

The size of the allocated objects generated while performing the transaction is determined at step 830. The size of the allocated objects may be determined manually or automatically. Determining a size of an allocated object manually involves determining the size of primitives and other object content within each generated object. An object may have a basic framework and one or more variables that require memory space when stored to memory 144. For example, the general object framework may require thirty-two bytes. Different types of primitives may require different sizes of memory, for example, four bytes for an integer type, eight bytes for a long type, two bytes per character in a string type, and other content may require other bytes of data. The data sizes given for are example only; other variables and variable sizes may be used. When an object instantiates another object, the instantiated object size is also considered part of the object measured as part of a chain of allocation at step 830.

The size of an allocated object may be measured automatically. In some embodiments, a method may be invoked to automatically determine how much memory space an allocated object requires. For example, in Java 1.5 Platform, a method "getObjectSize" may be invoked with a parameter "objectToSize" specifying the allocated object. The method then returns the size of the allocated object. The method may be part of the "Instrumentation" interface of Java 1.5 Platform.

After determining the size of allocated objects generated by a thread, the thread class, method, thread object identifier, URL associated with the thread and size of all the allocated object content for the thread is reported at step 840. In some embodiments, monitoring code within the application may retrieve the URL from the thread object associated with the transaction and thread processing the transaction. The data may be reported to agent 208. Agent 208 may then report the data as performance data to enterprise manager 220. The performance data may be aggregated or otherwise processed by agent 208 before being provided to enterprise manager 220.

Next, the portion of the non-transaction specific memory usage to attribute to a transaction is reported at step 850. Thus, some objects may be created and stored in memory 144 while one or more transactions are processed but may not be associated with a particular transaction. The total size of these objects is apportioned among the transactions which are processed during the time the object was created. The time period may be determined by a user, associated with a computer process, such as a JVM process, or some other time period. Determining and reporting non-transaction specific memory usage for a transaction wherein the usage is not attributed to a current transaction is discussed in more detail below with respect to the process of FIG. 9.

Figure 9:
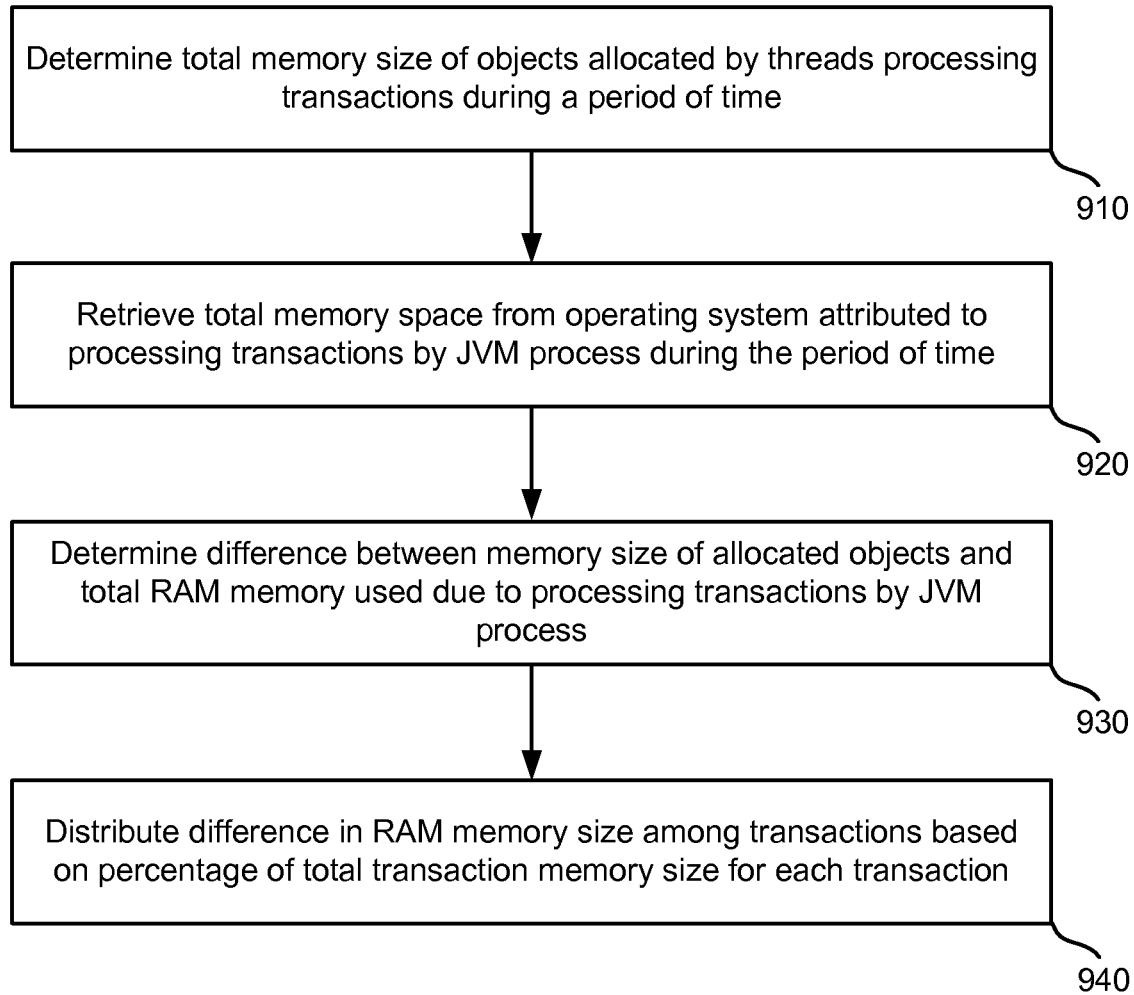
FIG. 9 is a flowchart of an embodiment of a process for determining the non-transaction specific memory capacity attributed to a transaction.

FIG. 9 is a flowchart of an embodiment of a process for determining non-transaction specific memory usage to attribute to a transaction. In some embodiments, the process of FIG. 9 provides more detail for step 850 of the process of FIG. 8. First, the total memory size of objects allocated by threads processing transactions during a period of time is determined at step 910. The period of time may be a user determined time, the time of a computer process such as a JVM process, or some other period of time. In some embodiments, the period of time considered for determining non-transaction specific memory usage is the same period of time for determining other non-transaction specific resource usage, such as CPU time discussed with respect to FIG. 7, hard disk discussed with respect to FIG. 11 and network I/O bandwidth discussed with respect to FIG. 13.

Next, the total memory space attributed to the JVM process, or a portion of the JVM process associated with a time period, in which the transactions were performed is determined at step 920. The total memory space may include the memory space required by the transaction objects as well as other objects created but not associated with a particular transaction. The total JVM process memory space may be retrieved from operating system 149, software or some other system associated with memory 144, or some other source.

Next, the difference between the total transaction memory space and the total JVM process memory space used, for a period of time shorter than the JVM if applicable, is determined at step 930. The difference in memory space is then distributed among the transactions based on the memory size load for each transaction at step 940. In some embodiments, the distribution of the difference in memory space is determined. The percentage load of total memory can be determined similar to that for CPU percentage load with respect to FIG. 7B. For example, if a first object requires twenty bytes, the total object memory space for a JVM process requires two hundred bytes, and the non-transaction specific memory usage is thirty bytes, then the percentage load of the first object is ten percent and the non-transaction specific memory usage to attribute to the first object is three bytes.

Figure 10:
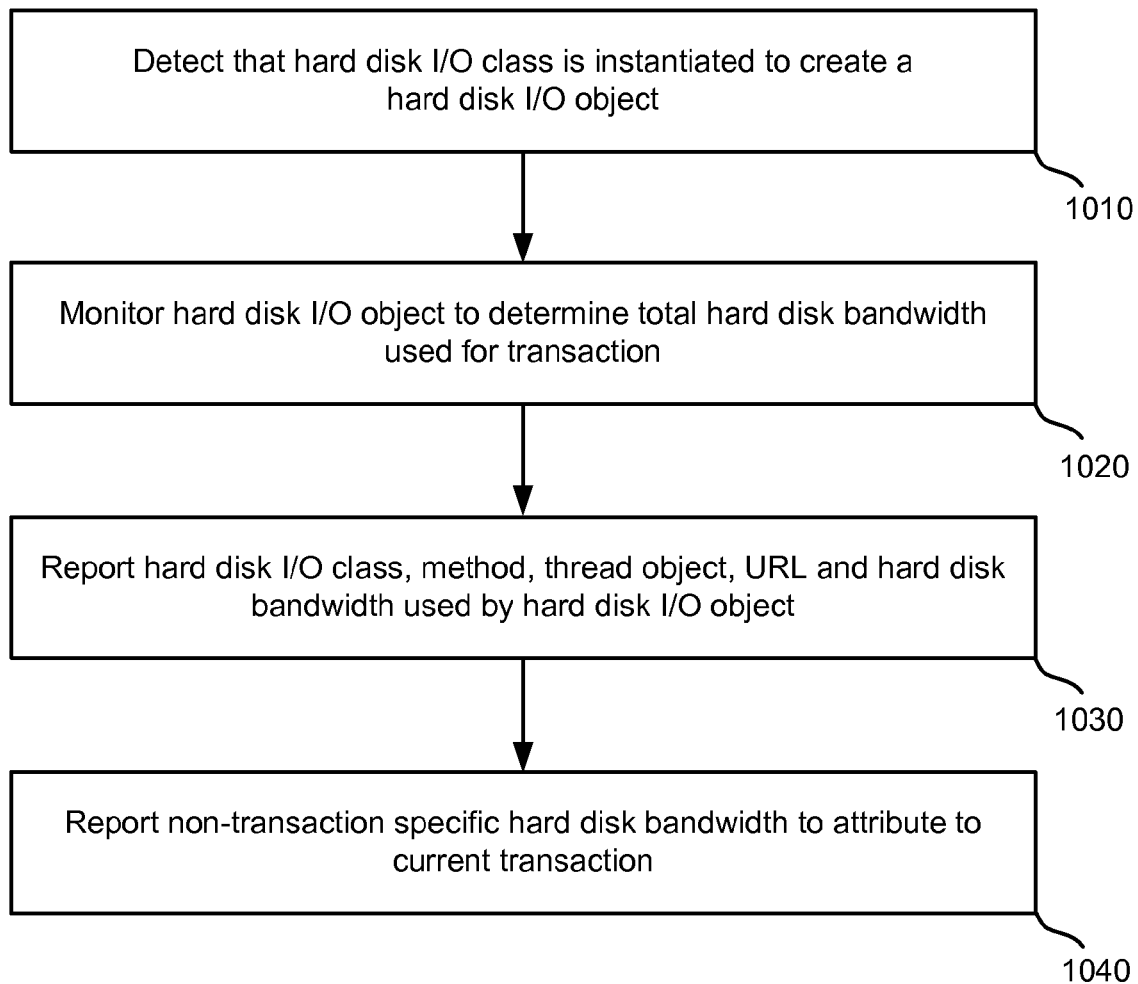
FIG. 10 is a flowchart of an embodiment of a process for determining hard disk bandwidth used for a transaction.

FIG. 10 is a flowchart of an embodiment of a process for determining hard disk bandwidth used for a transaction. In some embodiments, the process of FIG. 10 provides more detail for step 340 of FIG. 3 with respect to hard disk bandwidth. Hard disk bandwidth is determined in terms of the amount of data that written to and read from hard disk 146 in bytes of data per second during transaction execution.

First, the instantiation of a hard disk I/O class is detected at step 1010. The hard disk I/O class is instantiated to create a hard disk I/O object. Creation of the object may be detected by monitoring code placed in the hard disk I/O class. Several classes and/or methods may be used to read and write to a hard disk. In some embodiments, monitoring code can be placed in several classes and methods associated with performing a write or read operation with respect to hard disk 146. The monitoring code may then add code to the hard disk I/O object when the class is instantiated. For example, one hard disk I/O class which may be modified to include monitoring code is "java.io.fileinputstream."

Hard disk I/O objects are then monitored to determine the amount of hard disk bandwidth used by the object at step 1020. As discussed above, the hard disk bandwidth used is the amount of data read from or written to hard disk 146 per second. The hard disk I/O object is monitored by code placed in the object by monitoring code inserted into the object class. In some embodiments, a thread object may also be monitored to detect creation of the hard disk I/O object the size of the data written to and from hard disk 146 from the thread.

Next, the hard disk I/O class, method used to write the data, thread object identifier, URL and hard disk bandwidth used by the hard disk I/O object are reported at step 1030. Optionally, other data may be reported as well, such as the data length of the read and write operations performed. The data may be reported to agent 208. Agent 208 receives the data, optionally aggregates the data, and provides performance data to enterprise manager 220. The data may be reported to enterprise manager 220 as it becomes available or periodically, such as every fifteen seconds or some other time period.

A portion of the non-transaction specific hard disk bandwidth attributed to the current transaction is determined and reported at step 1040. Determining the non-transaction specific hard disk bandwidth utilized involves determining the hard disk bandwidth required for a process which includes transaction execution but not associated with the particular transaction itself. This hard disk bandwidth can be apportioned to one or more transactions by a percentage of the hard disk bandwidth load per transaction, or in some other manner. Determining and reporting non-transaction specific hard disk bandwidth to attribute to a transaction is discussed in more detail below with respect to FIG. 11.

Figure 11:
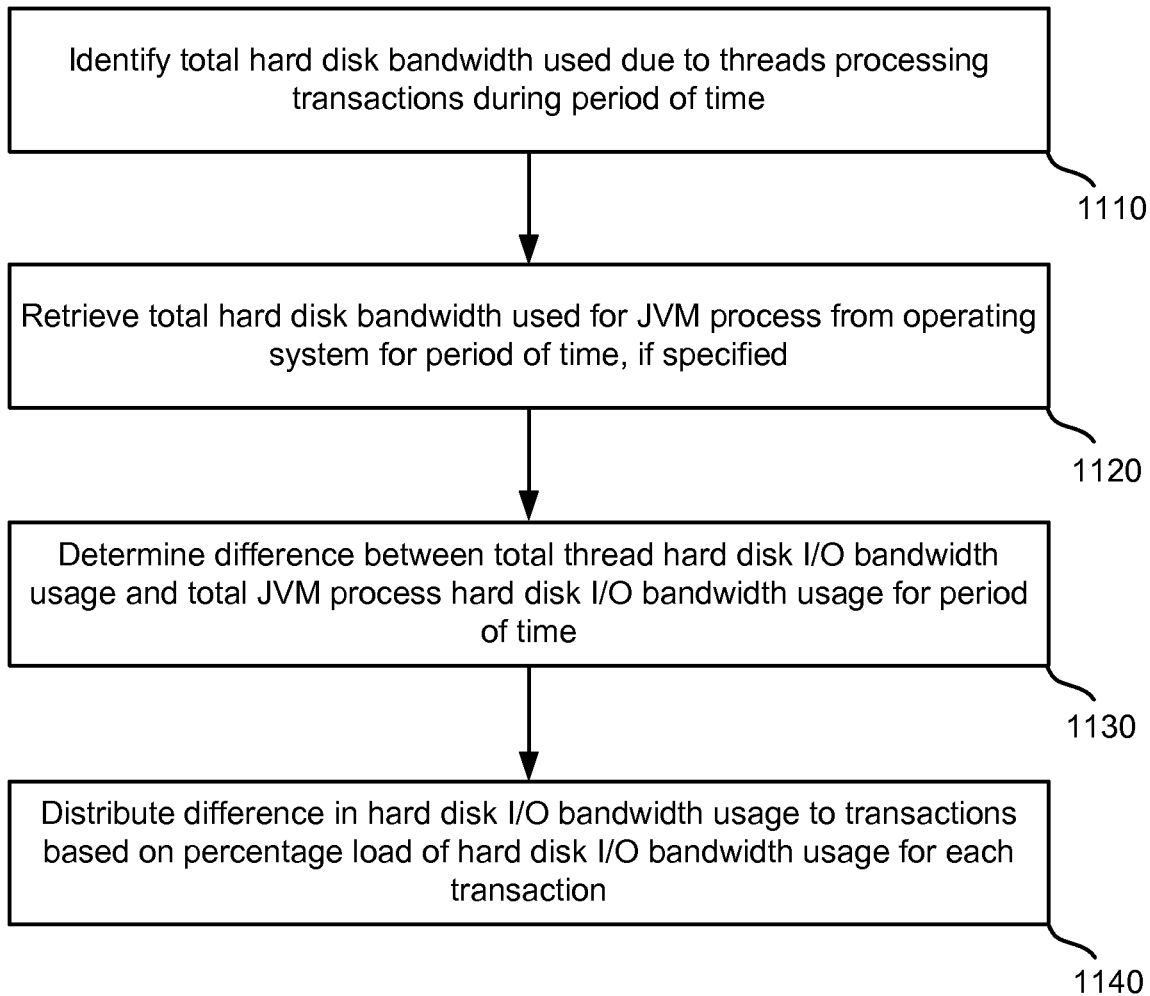
FIG. 11 is a flowchart of an embodiment of a process for determining non-transaction specific hard disk bandwidth usage to attribute to a transaction.

FIG. 11 is a flowchart of an embodiment of a process for determining non-transaction specific hard disk bandwidth to attribute to a transaction. In one embodiment, the process of FIG. 11 provides more detail at step 1040 of FIG. 10.

First, the total hard disk bandwidth used due to one or more threads and corresponding transactions is determined during a period of time at step 1110. In some embodiments, the hard disk bandwidth usage due to one or more transactions may be associated with a period of time, such as the time of a JVM process or some other time period. The hard disk bandwidth usage may be determined from performance data generated from monitoring application execution. Data is reported for each hard disk I/O object which writes or reads data to hard disk 146 (step 1030 of FIG. 10). The reported data indicates the thread object (and the corresponding transaction and URL) associated with the read or write operation. Thus, the reported data is processed to determine all the data read and write operations, including the size of each data read and write, performed to hard disk 146 during the period of time for the different transactions. The total hard disk bandwidth usage due to transactions may be determined by agent 208, enterprise manager 220 or some other module or system from the reported performance data.

Next, the hard disk bandwidth used for the JVM process in which the transactions were executed is identified at step 1120. The hard disk bandwidth used for the JVM process may be retrieved from operating system 149, software associated with hard disk 144 or some other source.

The difference between the total transaction hard disk bandwidth usage and the JVM process hard disk bandwidth usage is determined at step 1130. The difference may be determined for the entire JVM process, a period of time representing a portion of the JVM process, or some other time period. The difference is determined by subtracting the hard disk bandwidth usage due to the transactions or threads from the hard disk bandwidth usage for the JVM process. Next, the hard disk bandwidth usage difference is distributed to transactions based on the total amount of data read and write performed for each transaction at step 1140. In some embodiments, the difference in the hard disk bandwidth usage may be distributed to different transactions based on the load percentage bandwidth requirement for each transaction. This may be done similar to the process of FIG. 7B. For example, if a first transaction had a hard disk bandwidth usage of 8000 bytes per second and the total hard disk bandwidth usage for transactions of the JVM process was 40000 bytes per second, the first transaction would be attributed with twenty percent (8000/40000=20 percent) of the difference of hard disk bandwidth usage.

Figure 12:
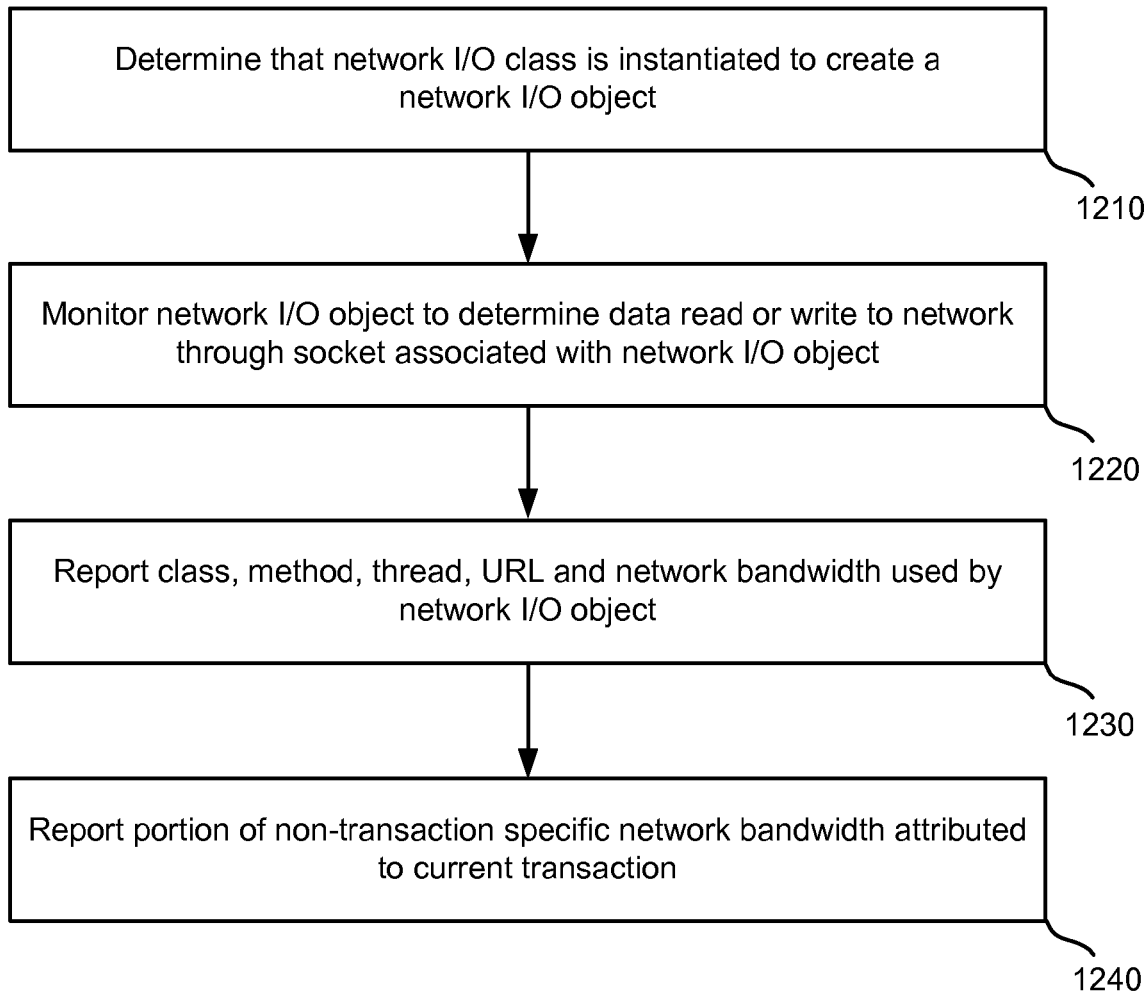
FIG. 12 is a flowchart of an embodiment of a process for determining a network bandwidth for a transaction.

FIG. 12 is a flowchart of an embodiment of a process for determining network bandwidth required for a transaction. In some embodiments, the process of FIG. 12 provides more detail for step 340 of FIG. 3 with respect to network input and output bandwidth for server 120. Network bandwidth is a resource in terms of the amount of data that can be sent and received by server 120 over network 115, or some other network, in terms of bytes of data per second.

First, the instantiation of a network I/O class is detected at step 1210. The network I/O class is instantiated to create a network I/O object. Creation of the object may be detected by monitoring code placed in the network I/O class. Several classes and/or methods may be used to send and receive data over network 115. In some embodiments, monitoring code can be placed in several classes and methods associated with performing a network data send or receive operation. The monitoring code may then add code to the network I/O object when the class is instantiated.

Network I/O objects are then monitored to determine the network bandwidth used by the network I/O object at step 1220. The network I/O object is monitored by code placed in the object by monitoring code inserted into the object class. In some embodiments, a thread object may also be monitored to detect creation of the network I/O object and the amount of data send to or a device over network 115 by the thread. As discussed above, the network bandwidth required for transaction execution is the amount of data received and sent over a network as a direct result of executing the transaction.

Next, the network I/O class, method used to send or receive the data, a thread object identifier, URL, the network bandwidth and optionally other data are reported at step 1230. The network bandwidth may be reported as length of data sent or received through a data stream or other network data. Agent 208 may receive the reported data, optionally aggregate the data, and provide performance data to enterprise manager 220. The data may be reported to enterprise manager 220 as it becomes available or periodically, such as every fifteen seconds.

A portion of the non-transaction specific network bandwidth usage attributed to the current transaction is determined and reported at step 1240. Determining the non-transaction specific network usage data involves determining the data sent and received from over network 115 but not associated with a particular transaction. This network bandwidth usage can be apportioned to one or more transactions by a percentage of the network bandwidth load per transaction, or in some other manner. Determining and reporting non-transaction specific network bandwidth to attribute to a transaction is discussed in more detail below with respect to FIG. 13.

Figure 13:
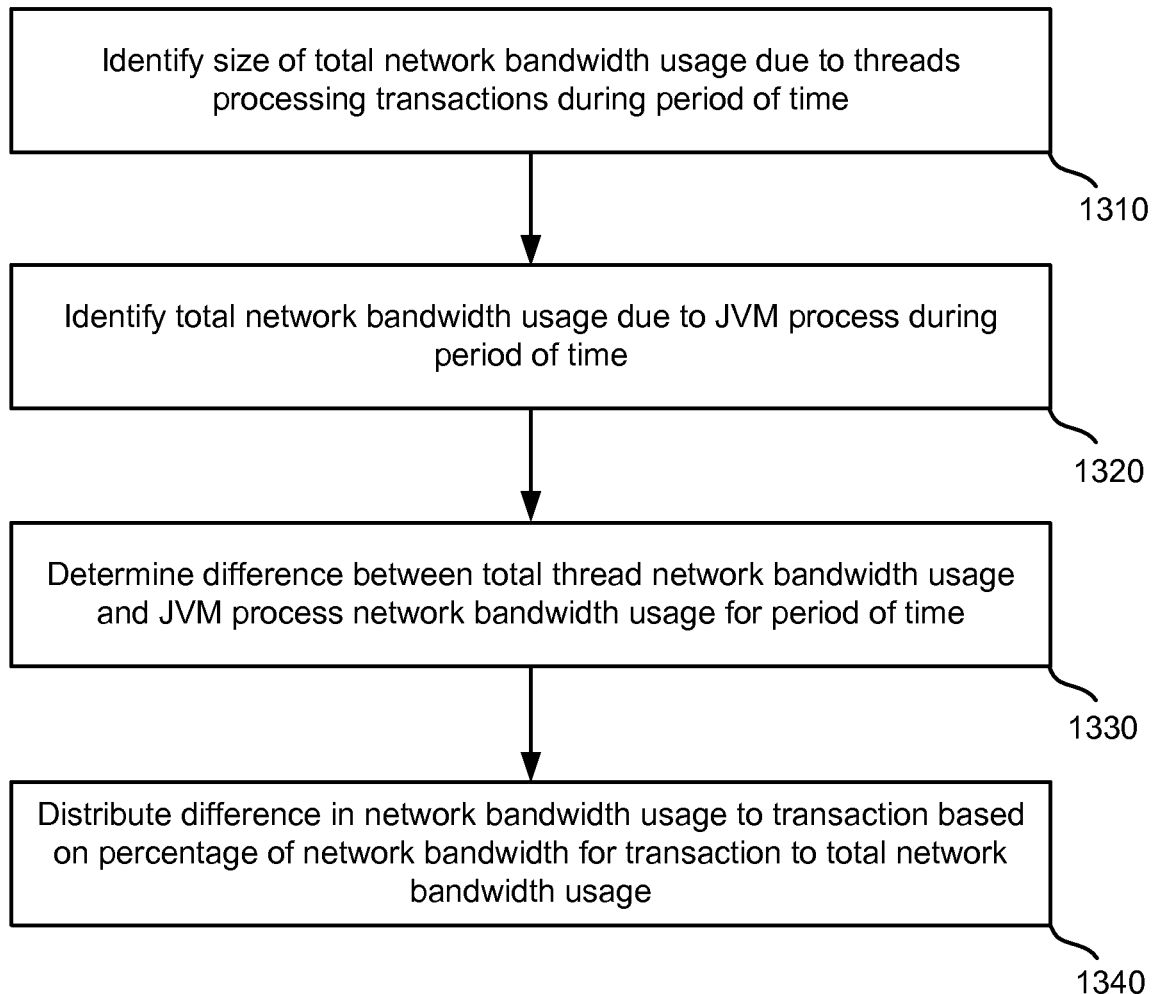
FIG. 13 is a flowchart of an embodiment of a process for determining the non-transaction specific network bandwidth usage to attribute to a transaction.

FIG. 13 is a flowchart of an embodiment of a process for determining non-transaction specific network bandwidth usage to attribute to a transaction. In one embodiment, the process of FIG. 13 provides more detail at step 1140 of FIG. 11.

The network bandwidth usage due to one or more threads and corresponding transactions performed during a JVM process is determined, optionally for a period of time, at step 1310. In some embodiments, the network bandwidth usage due to transactions may be associated with a period of time of a JVM process or some other time period. To determine the network bandwidth usage due to transactions, data is reported for each network I/O object which sends or receives data over network 115 (step 1130 of FIG. 11). The reported data indicates the thread object (and the corresponding transaction and URL) associated with the send or receive operation. The reported data is processed to determine the data sent and received, including the size of each data send and receive operation, during the period of time for the transaction associated with each thread. The network bandwidth usage due to all the transactions may be determined by agent 208, enterprise manager 220 or some other module or system.

The network bandwidth usage due to the JVM process in which the transactions were executed is identified at step 1320. The network bandwidth usage due to the JVM process may be retrieved from operating system 149, software associated with network 144 or some other source.

The difference between the transaction network bandwidth usage and the JVM process network bandwidth usage is determined at step 1330. The difference may be determined for the entire JVM process, a period of time representing a portion of the JVM process, or some other time period. The difference is determined by subtracting the network bandwidth usage due to the transactions or threads from the network bandwidth usage for the JVM process. Next, the network bandwidth usage difference is distributed to transactions based on the total amount of data sent or received for each transaction at step 1340. In some embodiments, the difference in the network bandwidth usage may be distributed to different transactions based on the load percentage usage for each transaction. This may be done similar to the process of FIG. 7B. For example, if a first transaction had a network bandwidth usage of 2000 bytes per second and the total network bandwidth usage for transactions of the JVM process was 8000 bytes per second, the first transaction would be attributed with twenty-five percent (2000/8000=25 percent) of the difference of network bandwidth usage.

Figure 14:
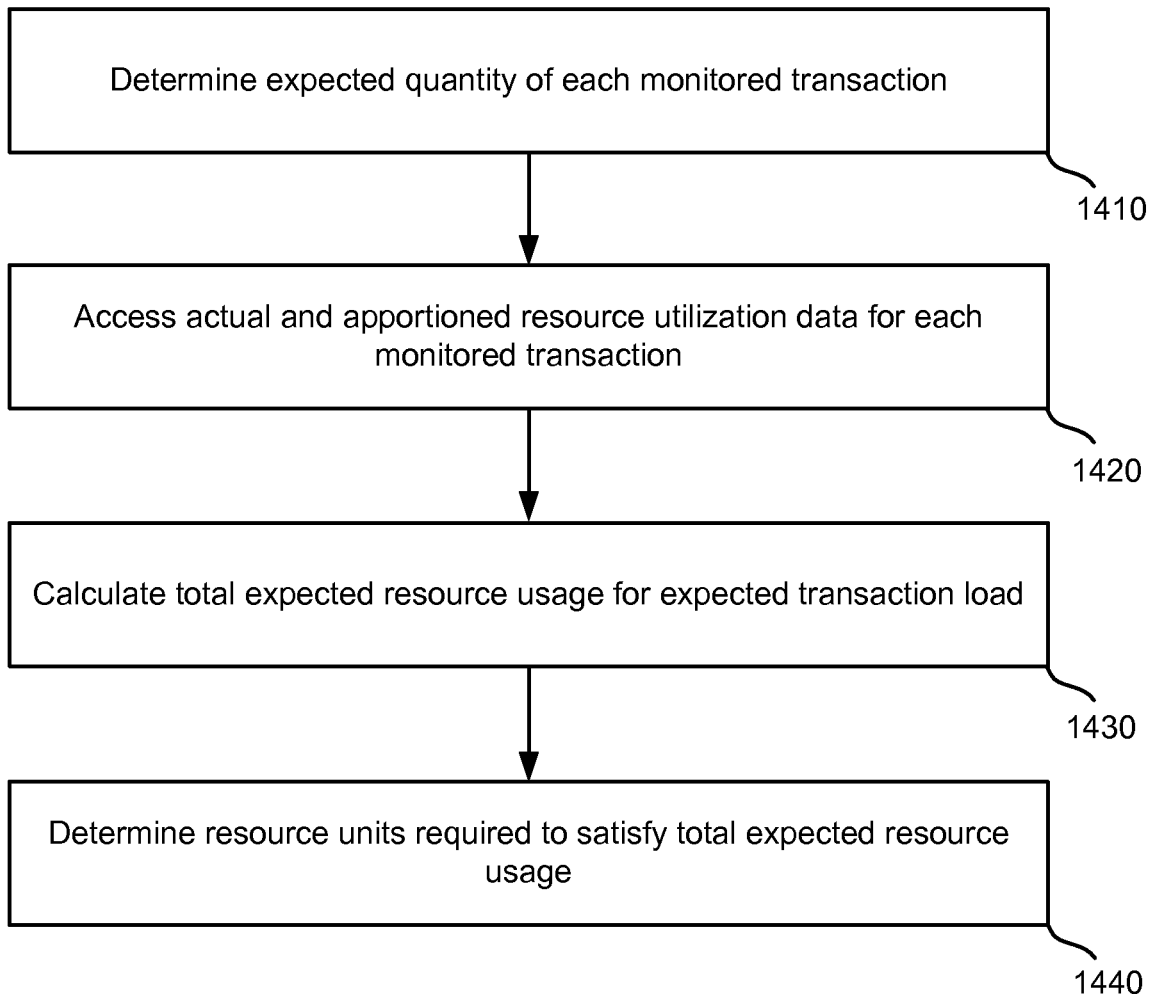
FIG. 14 is a flowchart of an embodiment of a process for capacity planning based on resources used for a transaction.

FIG. 14 is a flowchart of an embodiment of a process for capacity planning based on resources used for a transaction. In some embodiments, FIG. 14 provides more detail of step 350 of FIG. 3.

First, the expected quantity of each monitored transaction is determined at step 1410. The expected quantity may be determined from sales, past activity of a server system or from other data. The expected quantity may be determined in terms of transactions or URLs. For example, the expected quantity may include 10,000 hits on a URL associated with a web page for changing a shipping address. In some embodiments, the URL may be normalized. For example, an expected quantity may be indicated for URLs that provide product information for children's DVDs. Thus, URLs of http://site.com/productpage/dvd/children/animated, http://site.com/productpage/dvd/children/education, and http://site.com/productpage/dvd/children/movies may be normalized into one URL of http://site.com/productpage/dvd/children/. In some embodiments, a normalized URL may be determined based on grouping two or more URLS in some other manner, such as a manner of grouping URLs as described in U.S. patent application Ser. No. 11/565,723, entitled, "Automated Grouping of Messages Provided to an Application Using Execution Path Similarity Analysis," filed on Dec. 1, 2007, having inventors, Jyoti Bansal, David Seidman, and Mark Addleman, or U.S. patent application Ser. No. 11/565,730, entitled, "Automated Grouping of Messages Provided to an Application Using String Similarity Analysis," filed on Dec. 1, 2006, having inventors Jyoti Bansal, David Seidman, and Mark Addleman, herein incorporated by reference.

Next, the resource utilization data for each monitored transaction is accessed at step 1420. The resource utilization data indicates how much resource usage is required to perform each transaction or URL request. The resource utilization data is determined by the processes of FIGS. 6-13. In some embodiments, the resource usage for each transaction may include actual resource usage as well as non-transaction specific resource usage which is attributed to the transaction.

The total expected resource usage is calculated for the expected transaction load at step 1430. The total expected resource usage may be calculated as the expected quantity of transactions multiplied by the transaction resource requirements. Next, resource units required to satisfy the total expected resource usage are determined at step 1440. An example of calculations involving total expected resource usage determining resources required for expected resource usage is discussed with respect to FIGS. 15A-B.

FIG. 15A is a table having exemplary data relating to resource usage for a number of transactions. The table of FIG. 15A includes column headings of URL, CPU usage direct, CPU usage attributed, memory usage direct, memory usage attributed, hard disk bandwidth (HD BW) usage direct, hard disk bandwidth (HD BW) usage attributed, network bandwidth usage direct, and network bandwidth usage attributed. The URL column includes three sample URLS. The CPU columns include the CPU usage directly associated with the URL and the non-transaction specific CPU usage attributed to the URL (per step 660 of FIG. 6). The memory columns include the memory usage directly associated with the URL and the non-transaction specific memory usage attributed to the URL (per step 850 of FIG. 8). The hard disk bandwidth columns include the CPU usage directly associated with the hard disk bandwidth and the non-transaction specific hard disk bandwidth usage attributed to the URL (per step 1040 of FIG. 10). The network bandwidth columns include the CPU usage directly associated with the network bandwidth and the non-transaction specific network bandwidth usage attributed to the URL (per step 1240 of FIG. 12). The rows of the table display resource usage data for three URLs. For example, the URL http://site.com/productpage/dvd/children/education has a direct CPU usage of 3 ms, an attributed CPU usage of 0.5 ms, a direct memory usage of 200 bytes, an attributed memory usage of 80 bytes, a direct hard disk bandwidth usage of 2200 bytes/second, an attributed hard disk bandwidth usage of 419 bytes/second, a direct network bandwidth usage of 2000 bytes/second and an attributed hard disk bandwidth usage of 300 bytes/second. The attributed resource usages are determined as a percentage load of arbitrarily chosen values of 2 milliseconds of CPU usage, 240 bytes of memory usage, 800 bytes/second of hard disk bandwidth usage and 600 bytes/second of network bandwidth usage, all as indicated in the table.

FIG. 15B is a table having exemplary data relating to expected resource usage for a number of expected transactions. The table of 15B includes column headings of transactions expected, total CPU usage per transaction, CPU usage expected, total memory usage/transaction, memory usage expected, total hard disk bandwidth usage/transaction, hard disk bandwidth usage expected, total network bandwidth usage/transaction, and network bandwidth usage expected. The data values in table 15B are based on the arbitrarily chosen values in the table of FIG. 15A. The rows of the table of FIG. 15B include expected resource usage data for three transactions and the total resource usage expected. For example, the URL http://site.com/productpage/dvd/children/education has an expected load of forty transactions. This expected load corresponds to an expected CPU usage of 130 milliseconds based on 3.5 milliseconds of total CPU usage/transaction, an expected memory usage of 11.2 KB of memory based on 280 bytes of memory usage/transaction, an expected hard disk bandwidth of 104.8 KB/second based on total hard disk bandwidth usage/transaction of 2619 bytes/second, and an expected network bandwidth usage of 92 KB/second based on network bandwidth usage/transaction of 2300 bytes/second. The total expected resource usage for all three transactions in the table of FIG. 15B are 445 milliseconds of CPU usage, 35 KB of memory usage, 240.3 KB/second of hard disk bandwidth usage and 172.5 KB/second of network bandwidth usage. The expected total resource usage values may be used to determine what resources are needed by a system. For example, hypothetically, if a unit of memory only contains 10 KB, then four memory units would be need to satisfy the expected memory usage of 35 KB for the three transactions. Similar calculations may be made for the other expected resource values and corresponding resource data.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A computer implemented method, comprising:
   monitoring a plurality of types of transactions that are executed by an application using one or more resources;
   determining, for each of the types of transactions, a first usage of each of the one or more resources that is directly attributable to each of the plurality of types of transactions based on the monitoring; and
   associating a second usage of each of the one or more resources with one or more of the plurality of types of transactions based on the monitoring, the second usage associated with non-transaction specific usage of the one or more resources, the associating comprises attributing a portion of the non-transaction specific usage of the one or more resources to each of the one or more types of transactions.

2. The computer implemented method of claim 1, further comprising:
   receiving one or more requests over a network, the plurality of types of transactions performed in response to receiving the one or more requests.

3. The computer implemented method of claim 2, wherein the request is a URL request.

4. The computer implemented method of claim 1, wherein the attributing comprises determining the second usage for a first type of transaction of the plurality of types of transactions by determining a load percentage of the first type of transaction with respect to the total load of the plurality of types of transactions that use the one or more resources.

5. The computer implemented method of claim 4, wherein the transactions are performed by a computer process.

6. The computer implemented method of claim 5, wherein the computer process is a Java Virtual Machine (JVM) process.

7. The computer implemented method of claim 1, wherein said attributing a portion of the non-transaction specific usage comprises:
   determining the total usage level of the one or more resources by the plurality of types of transactions during a period of time as part of a computer process.

8. The computer implemented method of claim 7, wherein said attributing a portion of the non-transaction specific usage comprises:
   determining the total resource usage during the period of time with respect to the computer process.

9. The computer implemented method of claim 1, further comprising:
   inserting monitoring code into the application, the monitoring code for monitoring the application at runtime and reporting performance data based on monitoring the plurality of types of transactions, wherein the first usage and the second usage is derived from the performance data.

10. The computer implemented method of claim 1, further comprising:
    generating performance data in response to monitoring the plurality of types of transactions, the first usage and the second usage derived from the performance data.

11. The computer implemented method of claim 1, wherein said attributing comprises:
    attributing a portion of the non-transaction specific usage of a first of the resources to a first of the types of transactions based on the percentage of direct usage of the first resource by the first type of transaction.

12. The computer implemented method of claim 1, wherein the attributing comprises assigning a second usage to a first of the types of transactions based on a load percentage of the first type of transaction with respect to the total load of the plurality of types of transactions that use the resource.

13. The computer implemented method of claim 1, wherein the plurality of types of transactions are performed during a Java Virtual Machine (JVM) process.

14. One or more non-transitory processor readable storage devices having processor readable code embodied on said processor readable storage devices, said processor readable code for programming one or more processors to:
    monitor a plurality of transactions that are performed by a corresponding plurality of threads in response to requests to perform the transactions;

determine, based on the monitoring, the utilization of each of one or more computer components by the threads while performing the plurality of transactions;

attribute the utilization of each of the one or more computer components by each of the threads to the corresponding type of transaction of the plurality of transactions;

determine utilization of the one or more computer components by the types of transactions that is not specific to the threads; and attribute a portion of computer component usage that is not specific to the threads to each of the types of transactions.

15. The one or more processor readable storage devices of claim 14, said code for programming said processor to determine the utilization of each of the one or more computer components by the threads comprises code for programming said processor to:

determine a utilization of the one or more processors for performing the plurality of transactions.

16. The one or more processor readable storage devices of claim 15, wherein said code for programming said processor to determine the utilization of each of the one or more computer components by the threads comprises code for programming said processor to:

determine a time used to process the plurality of transactions by the one or more processors.

17. The one or more processor readable storage devices of claim 14, said code for programming said processor to determine the utilization of each of the one or more computer components by the threads comprises code for programming said processor to:

determine a utilization of a memory system for performing the plurality of transactions.

18. The one or more processor readable storage devices of claim 17, wherein said code for programming said processor to determine the utilization of each of the one or more computer components by the threads comprises code for programming said processor to:

determine a size of data stored to the memory system due to processing the plurality of transactions.

19. The one or more processor readable storage devices of claim 18, wherein the data stored to the memory system is one or more allocated objects.

20. The one or more processor readable storage devices of claim 17, the memory system comprising random access memory.

21. The one or more processor readable storage devices of claim 17, wherein the memory system comprises a hard disk device.

22. The one or more processor readable storage devices of claim 14, said code for programming said processor to determine the utilization of each of the one or more computer components by the threads comprises code for programming said processor to:

determine a utilization of network bandwidth for the plurality of transactions.

23. The one or more processor readable storage devices of claim 14, wherein said code for programming said processor to determine the utilization of each of the one or more computer components by the threads comprises code for programming said processor to:

monitor the data communicated through a network socket allocated for the plurality of transactions.

24. The one or more processor readable storage devices of claim 14, wherein the one or more computer components comprise a central processing unit and random access memory residing on one machine.

25. A computer implemented method, comprising:

monitoring a first type of transaction of a plurality of types of transactions that are executed by a system using one or more resources;

receiving application runtime data regarding the one or more resources based on the monitoring, the data comprising transaction-specific application runtime data that is directly attributable to resource usage of the first type of transaction and non-transaction specific data that is indirectly attributable to resource usage of the plurality of types of transactions; and determining an amount of each of the one or more resources used for the first type of transaction based on the transaction-specific application runtime data and the non-transaction specific data, the determining comprises attributing a portion of non-transaction specific usage of the one or more resources by the plurality of types of transactions to the first type of transaction.

26. The computer implemented method of claim 25, further comprising:

receiving a URL request, the first type of transaction performed in response to the URL request.

27. The computer implemented method of claim 25, wherein the resources comprise a CPU, RAM memory, hard disk memory and network socket connections.

28. The computer implemented method of claim 25, wherein the plurality of types of transactions are performed as part of a computer process, further comprising determining an amount of each of the one or more resources used for the plurality of transactions, comprising:

determining a first amount of each resource used during the computer process to directly perform each of the plurality of types of transactions, and determining a second amount of each resource used during the computer process which is not directly attributed to individual ones of the plurality of types of transactions.

29. The computer implemented method of claim 28, wherein the second amount of each resource used is attributed to the first type of transaction based on the percentage of resource usage for the first type of transaction with respect to resource usage for the plurality of types of transactions.

30. The computer implemented method of claim 28, further comprising determining the resources needed for an expected occurrence of the types of transactions based on the amount of each resource used for each of the types of transactions.

31. The computer implemented method of claim 25, further comprising:

determining the number of resources needed to meet an expected capacity based on the amount of each of the one or more resources used for the first type of transaction.

32. One or more non-transitory processor readable storage devices having processor readable code embodied on said processor readable storage devices, said processor readable code for programming one or more processors to:

monitor two or more types of transactions in response to requests to perform the two or more types of transactions using one or more resources; and determine a first usage level of each of the one or more resources for a first type of transaction of the two or more types of transactions based on the monitoring, the first usage level is based on resource utilization that is directly attributable to the first type of transaction; and determine a second usage level for the one or more resources to attribute to the first type of transaction based on the monitoring, the second usage level indirectly attributable to the first type of transaction, the determining the second usage level comprises apportioning resource usage of the two or more types of transactions that is indirectly attributable to the first type of transaction to the first type of transaction.

33. The one or more processor readable storage devices of claim 32, the requests received as a URL request, wherein the code for programming one or more processors to determine a first usage comprises code for programming said one or more processors to associate the first type of transaction with a uniform resource locator.

34. The one or more processor readable storage devices of claim 32, wherein the second usage is apportioned to the first type of transaction by a load percentage of the first type of transaction with respect to the total load of the two or more type of transactions that use the one or more resources.

35. The one or more processor readable storage devices of claim 34, wherein the type of transactions are performed as part of a computer process.

36. The one or more processor readable storage devices of claim 35, wherein the computer process is a Java Virtual Machine (JVM) process.

37. The one or more processor readable storage devices of claim 32, wherein said code for programming said one or more processors to determine a second usage level comprises code for programming said one or more processors to:
   determine the total usage level of the one or more resources by the two or more types of transactions during a period of time as part of a computer process.

38. The one or more processor readable storage devices of claim 37, wherein said code for programming said one or more processors to determine a second usage level comprises code for programming said one or more processors to:
   determine the total resource use during the period of time with respect to the computer process.

39. An apparatus for processing data, comprising:
   one or more resources;
   a processor coupled to the one or more resources, the processor configured to:
   monitor a plurality of types of transactions that are executed by an application using the one or more resources;
   determine, for each of the types of transactions, a first usage of each of the one or more resources that is directly attributable to each of the plurality of types of transactions based on the monitoring; and
   associate a second usage of each of the one or more resources with one or more of the plurality of types of transactions based on the monitoring, the second usage associated with non-transaction specific usage of the one or more resources, the associating comprises attributing a portion of the non-transaction specific usage of the one or more resources to each of the one or more types of transactions.

40. The apparatus of claim 39, wherein the one or more resources comprise at least one of:
   a hard disk, a storage device, or a communication interface.

* * * * *

UNITED STATES PATENT AND TRADEMARK OFFICE
CERTIFICATE OF CORRECTION

| | | |
|---|---|---|
| PATENT NO. | : 8,631,401 B2 | Page 1 of 1 |
| APPLICATION NO. | : 11/782346 | |
| DATED | : January 14, 2014 | |
| INVENTOR(S) | : Bansal et al. | |

It is certified that error appears in the above-identified patent and that said Letters Patent is hereby corrected as shown below:

In the Claims

Column 23, line 16, claim 34, line 5, please change "type of transactions" to -- types of transactions --

Signed and Sealed this
Twenty-seventh Day of May, 2014

Michelle K. Lee
*Deputy Director of the United States Patent and Trademark Office*